(12) United States Patent
Oberg

(10) Patent No.: US 11,061,582 B2
(45) Date of Patent: Jul. 13, 2021

(54) CODEWORD INTERLEAVING FOR MAGNETIC STORAGE MEDIA

(71) Applicant: Marvell Asia Pte, Ltd., Singapore (SG)

(72) Inventor: Mats Oberg, San Jose, CA (US)

(73) Assignee: Marvell Asia PTE, Ltd., Singapore (SG)

( * ) Notice: Subject to any disclaimer, the term of this patent is extended or adjusted under 35 U.S.C. 154(b) by 0 days.

(21) Appl. No.: 16/801,506

(22) Filed: Feb. 26, 2020

(65) Prior Publication Data
US 2020/0272339 A1    Aug. 27, 2020

Related U.S. Application Data

(60) Provisional application No. 62/810,785, filed on Feb. 26, 2019.

(51) Int. Cl.
*G11B 20/12*    (2006.01)
*G11B 20/14*    (2006.01)
(Continued)

(52) U.S. Cl.
CPC .......... *G06F 3/0614* (2013.01); *G06F 3/0659* (2013.01); *G06F 3/0676* (2013.01);
(Continued)

(58) Field of Classification Search
CPC .......... G11B 20/12; G11B 5/09; G11B 20/10; G11B 20/1419; G11B 20/1217;
(Continued)

(56) References Cited

U.S. PATENT DOCUMENTS

| 5,420,730 A | 5/1995 | Moon et al. |
| 5,535,067 A | 7/1996 | Rooke |

(Continued)

FOREIGN PATENT DOCUMENTS

| JP | 10255402 | 9/1998 |
| JP | 2006031825 | 2/2006 |
| WO | 2020185792 | 9/2020 |

OTHER PUBLICATIONS

"Extended European Search Report", European Application No. 19192790.4, dated Jan. 3, 2020, 7 pages.
(Continued)

*Primary Examiner* — Nabil Z Hindi

(57) ABSTRACT

The present disclosure describes aspects of codeword interleaving for magnetic storage media. In some aspects, segments of a codeword are spread or interleaved across multiple sectors of magnetic storage media. Data for one or more codewords may be received by a read channel and, for each codeword, a respective indicator is selected or received. The indicator may indicate which partitions of the multiple sectors that segments of one of the codewords are to be written. The data is then encoded to provide the codewords and segments of the codewords are placed in an interleaver based on the respective indicator corresponding to the codeword. The codeword segments are written from the interleaver to partitions of the multiple sectors of the magnetic storage media. By so doing, codewords may be spread across multiple sectors, such that a loss of a few sectors does not prevent readback and decoding of the codewords.

20 Claims, 11 Drawing Sheets

(51) Int. Cl.
*G06F 3/06* (2006.01)
*G11B 20/00* (2006.01)
*G11B 20/18* (2006.01)

(52) U.S. Cl.
CPC .... *G11B 20/00007* (2013.01); *G11B 20/1217* (2013.01); *G11B 20/1809* (2013.01); *G11B 20/1833* (2013.01); *G11B 20/1866* (2013.01); *G11B 2220/2516* (2013.01)

(58) Field of Classification Search
CPC .......... G11B 20/1833; H03M 13/1102; H03M 13/09; H03M 13/27; H03M 13/373; H03M 13/3761
USPC ..................... 360/39, 48, 44, 77.04; 714/758
See application file for complete search history.

(56) References Cited

U.S. PATENT DOCUMENTS

| | | | |
|---|---|---|---|
| 5,636,075 | A | 6/1997 | Nishimura et al. |
| 6,023,386 | A | 2/2000 | Reed et al. |
| 6,175,319 | B1 | 1/2001 | Schneider et al. |
| 6,501,610 | B1 | 12/2002 | Sugawara et al. |
| 6,574,754 | B1 | 6/2003 | Smith |
| 7,236,911 | B1 | 6/2007 | Gough et al. |
| 8,508,878 | B1 | 8/2013 | Zou et al. |
| 8,508,879 | B1 | 8/2013 | Zou et al. |
| 8,792,197 | B1 | 7/2014 | Wilson et al. |
| 8,873,181 | B1 | 10/2014 | Zou et al. |
| 8,929,013 | B1 | 1/2015 | Mastrocola et al. |
| 9,059,737 | B2 * | 6/2015 | Coker ................ G11B 20/1833 |
| 9,530,447 | B2 | 12/2016 | Gao et al. |
| 10,068,609 | B1 | 9/2018 | Mostafa et al. |
| 10,115,415 | B1 | 10/2018 | Tang et al. |
| 10,276,198 | B1 | 4/2019 | Katchmart et al. |
| 10,734,016 | B2 | 8/2020 | Oberg et al. |
| 10,971,187 | B2 | 4/2021 | Katchmart |
| 10,984,822 | B2 | 4/2021 | Oberg et al. |
| 2004/0201913 | A1 | 10/2004 | Sutardja |
| 2010/0241922 | A1 | 9/2010 | Furuhashi et al. |
| 2014/0244926 | A1 | 8/2014 | Yang et al. |
| 2018/0060192 | A1 | 3/2018 | Eggert et al. |
| 2020/0066299 | A1 | 2/2020 | Oberg et al. |
| 2020/0202893 | A1 | 6/2020 | Katchmart |
| 2020/0251143 | A1 | 8/2020 | Nangare |
| 2020/0294549 | A1 | 9/2020 | Katchmart |
| 2020/0342900 | A1 | 10/2020 | Oberg et al. |

OTHER PUBLICATIONS

"Extended European Search Report", European Application No. 20154549.8, dated Jul. 2, 2020, 6 pages.

"International Search Report and Written Opinion", PCT Application No. PCT/IB2020/051657, dated May 19, 2020, 14 pages.

"International Search Report and Written Opinion", PCT Application No. PCT/US2020/021911, dated Jun. 2, 2020, 13 pages.

"Notice of Allowance", U.S. Appl. No. 16/545,966, dated Mar. 23, 2020, 7 Pages.

"Run-Length Limited", URL: https://en.wikipedia.org/wiki/Run-length_limited, Oct. 18, 2019, 10 pages.

Xu, et al., "Health Status Assessment and Failure Prediction for Hard Drives with Recurrent Neural Networks", IEEE Transactions on Computers, vol. 65, No. 11, Nov. 2016, Nov. 2016, 7 pages.

"Pre-Interview Communication", U.S. Appl. No. 16/812,960, dated Oct. 2, 2020, 7 pages.

"International Preliminary Report on Patentability", PCT Application No. PCT/US2020/021911, dated Dec. 3, 2020, 6 pages.

"Notice of Allowance", U.S. Appl. No. 16/812,960, dated Dec. 9, 2020, 5 pages.

"Notice of Allowance", U.S. Appl. No. 16/928,971, dated Dec. 16, 2020, 8 pages.

"Correceted Notice of Allowance", U.S. Appl. No. 16/812,960, Mar. 4, 2021, 2 pages.

"Corrected Notice of Allowance", U.S. Appl. No. 16/928,971, Mar. 11, 2021, 2 pages.

* cited by examiner

CODEWORD INTERLEAVING FOR MAGNETIC STORAGE MEDIA

CROSS-REFERENCE TO RELATED APPLICATION

This present disclosure claims priority to U.S. Provisional Patent Application Ser. No. 62/810,785 filed Feb. 26, 2019, the disclosure of which is incorporated by reference herein in its entirety.

BACKGROUND

Electronic devices provide many services to modern society. These services enable an electronic device to provide entertainment, assist with scientific research and development, and provide many modern-day conveniences. Many of these services create or use data, which the electronic device stores. This data may include digital media such as books or movies, algorithms that execute complex simulations, personal user data, applications, and so forth. To avoid exceeding data storage limits, it is beneficial to increase the data storage capacity of the electronic device and avoid deleting data, limiting services, or purchasing additional external storage devices.

Many electronic devices use media drives to store data on disks, such as a hard-disk drive. Generally, the data of each disk is organized along concentric tracks of magnetic media in which bits of the data are written. Typically, the data of a device is grouped and written sequentially in blocks to respective physical sections of the magnetic media tracks. The magnetic media on a surface the disk, however, is often not uniform, such that quality of the magnetic media may vary substantially around the surface of the disk. Due to these variations, readback of the data from the magnetic media has a non-uniform signal-to-noise ratio (SNR). As such, data of the media drive may be lost when blocks of data are written to sections of poor-quality media or to sections that are degraded (e.g., due to a write head drifting off-track from a neighboring track), which may result in low SNR read signals or readback failure.

SUMMARY

This summary is provided to introduce subject matter that is further described in the Detailed Description and Drawings. Accordingly, this Summary should not be considered to describe essential features nor used to limit the scope of the claimed subject matter.

In various aspects, segments of a codeword are spread or interleaved across multiple sectors (e.g., physical locations) of magnetic storage media. Data for one or more codewords may be received by a read/write channel and, for each codeword, a respective indicator (e.g., index) is selected or received. The indicator may include an indicator that indicates into which partitions of the multiple sectors that segments of one of the codewords are to be written. The data is then encoded to provide the codewords and segments of the codewords are placed in an interleaver based on the respective indicators corresponding to the codeword. The segments of codewords are written from the interleaver to partitions of the multiple sectors of the magnetic storage media. By so doing, codewords may be spread across multiple sectors, such that a loss of a few sectors does not prevent readback and decoding of the codewords.

In some aspects, an interleaver of a storage media controller implements a method that comprises receiving data for one or more codewords to be written to a set of multiple sectors (e.g., physical locations or track sectors) of the magnetic storage media. For each of the one or more codewords, a respective indicator is selected that indicates within which partitions of the multiple sectors that segments of the codeword are to be written. The data is encoded to provide one or more codewords of encoded data and segments of the one or more codewords are placed into an interleave buffer based on the respective indicator corresponding to each of the codewords. The segments of each of the one or more codewords are then written from the interleave buffer to the partitions of at least some of the multiple sectors to interleave the respective segments of the codewords across the multiple sectors of the magnetic storage media. Alternatively or additionally, the segments of each of the one or more codewords may be written to non-consecutive ones of the multiple sectors, such as a partition of every other sector.

In other aspects, an apparatus comprises an interface to receive data from a host, a disk of magnetic storage media arranged in sectors to store the data, an interleave buffer configured to buffer segments of codewords for writing to the sectors of the magnetic storage media, and an interleaver. The interleaver is configured to receive, from the host device, data that corresponds to one or more codewords to be stored by multiple sectors of magnetic storage media. The interleaver selects, for each of the one or more codewords, a respective indicator indicating within which partitions of the multiple sectors that segments of the codeword are to be written. The data for the one or more codewords is then encoded to provide one or more codewords of encoded data. The interleaver then places, into the interleave buffer, segments of the one or more codewords based on the respective indicator corresponding to each of the codewords. The segments of the one or more codewords are written from the interleave buffer to the partitions of at least some of the multiple sectors to interleave the respective segments of the codewords across the multiple sectors of the magnetic storage media.

In yet other aspects, a System-on-Chip (SoC) is described that includes an interface to a storage media controller from which data is received for writing to magnetic storage media, an interface to a media writer of the magnetic storage media, an interleave buffer configured to buffer segments of codewords for writing to the sectors of the magnetic storage media, and an interleaver. The interleaver is configured to receive, from the storage media controller, data that corresponds to one or more codewords to be stored in multiple sectors of magnetic storage media. The interleaver also receives, from the storage media controller, respective indices indicating within which partitions of the multiple sectors that segments of each of the codewords are to be written. The data for the one or more codewords is encoded to provide one or more codewords of encoded data. The interleaver then places, into the interleave buffer, segments of the one or more codewords based on the respective indicator corresponding to each of the codewords. The segments of the one or more codewords are then written from the interleave buffer by the media writer to the partitions of at least some of the multiple sectors to interleave the respective segments of the codewords across the multiple sectors of the magnetic storage media.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of codeword interleaving for magnetic storage media are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
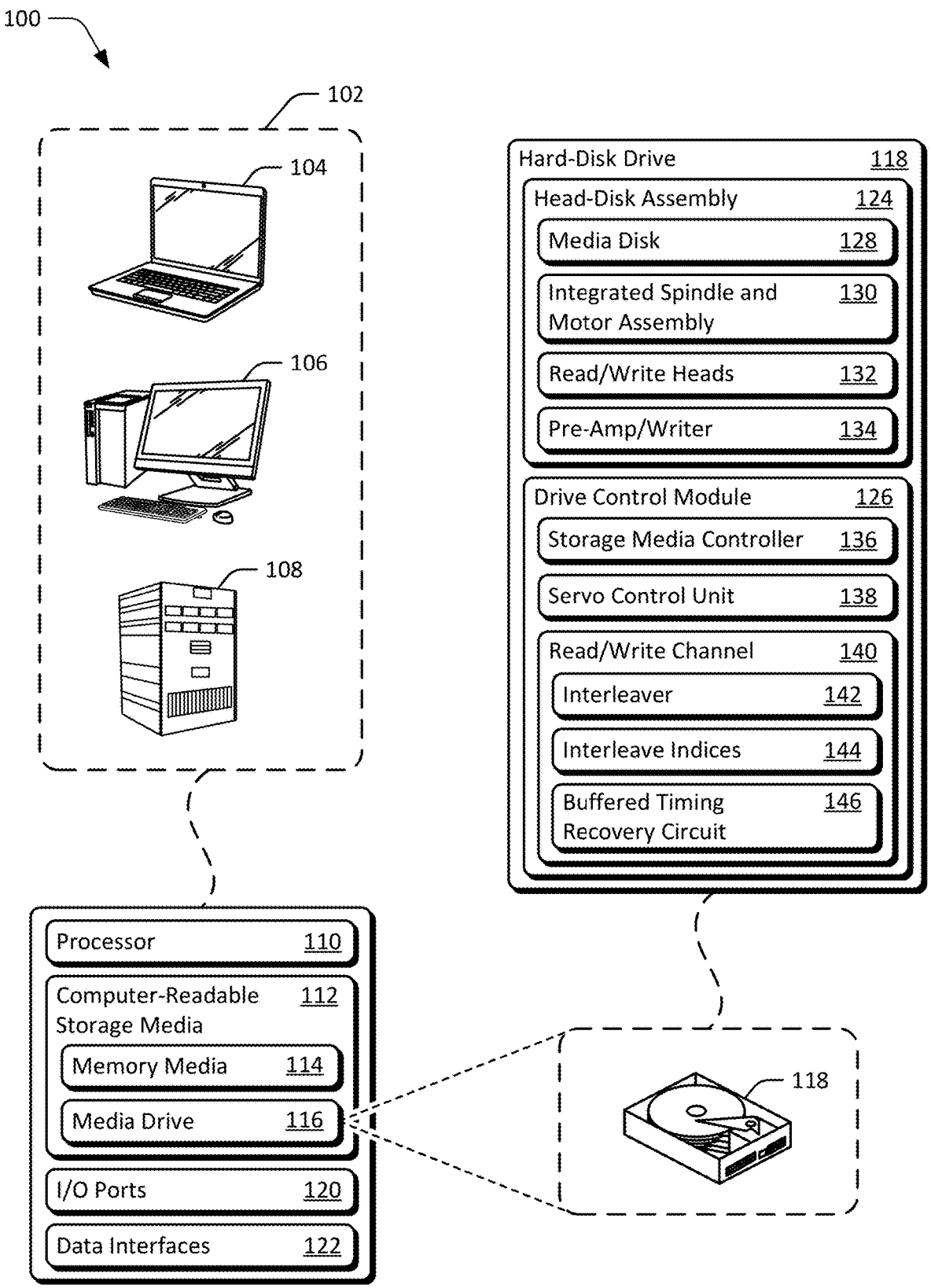
FIG. 1 illustrates an example operating environment having devices in which codeword interleaving for magnetic storage media may be implemented.

Conventional techniques for writing data to magnetic media of a disk often write blocks of data to respective physical sections of magnetic media track. Generally, the data of each disk is organized along concentric tracks of magnetic media in which blocks of data are written. Typically, the data is grouped and written sequentially such that each of the data blocks is written to a next portion of the magnetic media tracks. In other words, one block of data is written to one section of the magnetic media track. The magnetic media on a surface the disk, however, is often not uniform, such that the quality of the magnetic media may vary substantially around the surface of the disk. Due to these variations, readback of the data from the magnetic media has a non-uniform signal-to-noise ratio (SNR). As such, data of the media drive may be lost when blocks of data written to sections of poor-quality media or to sections that are degraded (e.g., due to a write head drifting off-track from a neighboring track), which may result in low SNR read signals or readback failure.

This disclosure describes apparatuses and techniques of codeword interleaving for magnetic storage media. In contrast with conventional data writing techniques, the described apparatuses and techniques may write segments (or portions) of a codeword across multiple sectors (e.g., physical locations) of a media track. Generally, a plurality of sectors of a media track or recording track are grouped or assigned as an interleaver group. These sectors of the interleaver group may be divided into or include partitions for storing segments of codewords, rather than entire codewords or sectors of user data. In some aspects, data for one or more codewords of the interleaver group is received, such as by a read/write channel of the magnetic storage media. Respective indicators or indices for the codewords may also be received that indicate within which partitions of the plurality sectors that segments of codewords are to be written. In some cases, the data is encoded to provide the one or more codewords. Segments of the one or more codewords are then placed in an interleaver (e.g., a buffer) based on the respective indicator (e.g., index) corresponding to the codeword. The segments of codewords are written from the interleaver to partitions of the multiple sectors to interleave the respective segments of the codewords across the multiple sectors of the interleaver group. As such, if one or two codeword segments are written to poor quality sectors or to sectors that become degraded (e.g., due to write head drift), other codeword segments from other sectors of the media track can be used to recover and decode the original data of the codeword, without using the codeword segments lost in the bad or degraded sectors.

In various aspects, segments of a codeword are spread or interleaved across multiple sectors of magnetic storage media. Data for one or more codewords may be received by a read/write channel and, for each codeword, a respective indicator (e.g., index) is selected or received. The indicator or index may indicate which partitions of the multiple sectors that segments of one of the codewords are to be written. The data is then encoded to provide the codewords and segments of the codewords are placed in an interleaver based on the respective indicator corresponding to the codeword. The segments of codewords are written from the interleaver to partitions of the multiple sectors of the magnetic storage media. By so doing, interleaved codeword segments may be spread across multiple sectors, such that a loss of a few sectors of a media track does not prevent readback and decoding of the codewords.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example operating environment 100 having a computing device 102 (e.g., host device), capable of storing to or accessing data from various storage device, such as a magnetic media-based drive. Examples of a computing device 102 may include a laptop computer 104, desktop computer 106, and server 108, any of which may be configured as part of a storage network or cloud storage. Further examples of a computing device 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on.

Generally, the computing device 102 may provide, communicate, or store data for any suitable purpose, such as to enable functionalities of a particular type of device, provide a user interface, enable network access, implement gaming applications, playback media, provide navigation, edit content, provide data storage, or the like. Alternatively or additionally, the computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

The computing device 102 includes a processor 110 and computer-readable storage media 112, in an embodiment. The processor 110 may be implemented as any suitable type or number of processors, either single-core or multi-core (e.g., ARM or x86 processor cores), for executing instructions or commands of an operating system or other programs of the computing device 102. The computer-readable storage media 112 (CRM 112) includes memory media 114 and a media drive 116. The memory media or system memory of the computing device 102 may include any suitable type or combination of volatile memory or nonvolatile memory. For example, volatile memory of the computing device 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications and/or an operating system of computing device 102.

The media drive 116 of the computing device 102 may include one or more media drives or be implemented as part of a data storage system with which the computing device 102 is associated. In this example, the media drive 116 includes a hard-disk drive 118 (HDD 118), which is capable of storing data and is described with reference to various aspects of codeword interleaving. Alternatively or additionally, the media drive 116 may be configured as any suitable type of data storage drive or system, such as a storage device, storage drive, storage array, storage volume, or the like. Although described with reference to the computing device 102, the media drive 116 may also be implemented separately as a standalone device or as part of a larger storage collective, such as a data center, server farm, or virtualized storage system (e.g., for cloud-based storage or services) in which aspects of codeword interleaving are implemented.

The computing device 102 may also include I/O ports 120, a graphics processing unit (GPU, not shown), and data interfaces 122. Generally, the I/O ports 120 allow a computing device 102 to interact with other devices, peripherals, or users. For example, the I/O ports 120 may include or be coupled with a universal serial bus, human interface devices, audio inputs, audio outputs, or the like. The GPU processes and renders graphics-related data for computing device 102, such as user interface elements of an operating system, applications, or the like. In some cases, the GPU accesses a portion of local memory to render graphics or includes dedicated memory for rendering graphics (e.g., video RAM) of the computing device 102.

The data interfaces 122 of the computing device 102 provide connectivity to one or more networks and other devices connected to those networks. The data interfaces 122 may include wired interfaces, such as Ethernet or fiber optic interfaces for data communicated over a local network, intranet, or the Internet. Alternatively or additionally, the data interfaces 122 may include wireless interfaces that facilitate communication over wireless networks, such as wireless LANs, wide-area wireless networks (e.g., cellular networks), and/or wireless personal-area-networks (WPANs). Any of the data communicated through the I/O ports 120 or the data interfaces 122 may be written to or read from the storage system of the computing device 102 in accordance with one or more aspects of codeword interleaving for magnetic storage media.

Returning to the media drive 116, the computing device 102 may include the hard-disk drive 118 as shown and/or other types of storage media on which codeword interleaving may be implemented. Although not shown, other configurations of the media drive 116 are also contemplated, such as a solid-state drive (SSD), a magnetic tape drive, optical media drives, HDD/SSD hybrid drives, and other storage systems that write data to storage media (e.g., magnetic or optical storage media). Alternatively or additionally, the computing device 102 may include an array of media drives or serve as a media drive aggregation device or host for multiple media drives in which aspects of codeword interleaving may be implemented.

In this example, the disk drive 118 includes a head-disk assembly 124 (HDA 124) and drive control module 126 to implement or enable functionalities of the hard-disk drive 118. In some cases, the drive control module 126 is implemented as a printed circuit board assembly (PCBA) with semiconductor devices, logic, or other circuitry. The HDA 124 includes one or more media disks 128 mounted on an integrated spindle and motor assembly 130. The spindle and motor assembly 130 may rotate the media disk 128 under (or over) read/write heads 132 coupled with a head assembly (not shown) of the HDA 124. The media disks 128 may be coated with a magnetically hard material (e.g., a particulate surface or a thin-film surface) and may be written to, or read from, a single side or both sides.

The read/write heads 132 may be operably coupled with a pre-amplifier/writer module 134 (pre-amp/writer 134) of the HDA 124 that includes pre-amplifier circuitry for amplifying write signals or read signals of the read/write heads 132. The pre-amp/writer 134 may receive or store head selection, amplification, or sense current values useful for writing data to, or reading data from, the magnetic media 202. The read/write heads 132 and/or pre-amp/writer 134 may be configured to function in concert or coordination with other components of the hard-disk-drive 118 to implement aspects of codeword interleaving.

As shown in FIG. 1, the example drive control module 126 of the hard-disk drive 118 includes a storage media controller 136, a servo control unit 138, and a read/write channel 140 (R/W channel 140). Generally, the storage media controller 136 enables the computing device 102 to access contents of magnetic storage media of the media drive 116, such as an operating system, applications, or data for applications or other services. The storage media controller 136 may also write and read data of the computing device 102 to and from the magnetic storage media of the media drive 116. In some cases, the drive control module 126 directs or uses the servo control unit 138 to control mechanical operations, such as read/write head 132 positioning through the HDA 124 and rotational speed control through the spindle and motor assembly 130.

The read/write channel 140 may include digital-to-analog and analog-to-digital paths for converting write data to a write signals or converting read signals to read data, respectively. For example, the read/write channel 140 may process and encode signals when data, such as sectors of user data, are written to the media disk 128 as segments of codewords. Alternatively or additionally, the read/write channel 140 may process and decode signals when encoded data, such as codeword segments, are read from multiple sectors of the media disk 128. This signal processing, encoding, and/or decoding of the write signals or read signals may include signal conditioning, sampling, equalization, phase adjustment, detection, error-correction, or the like. How the read/write channel 140 is implemented and used varies and is described throughout this disclosure. The drive control module 126 or components thereof may be implemented as one or more IC chips, a System-on-Chip, a System-in-Package, or a microprocessor provided with or implementing a hard-disk-drive controller. The drive control module 126 may also include drive electronics (not shown) and/or include various interfaces, such as a host-bus interface, storage media interface, spindle interface, or a pre-amp/writer interface.

In some aspects, the read/write channel 140 includes a sector interleaver 142 (interleaver 142), interleave indices 144, and a buffered timing recovery circuit 146. The interleaver 142 enables segmenting or dividing of user data or codewords to provide codeword segments, which may be interleaved or written across multiple sectors of magnetic storage media. In some cases, the sectors of a magnetic storage media or a media track are partitioned into sector partitions in which the segments of the codewords are written. Alternatively or additionally, the interleaver 142 may also read segments of codewords from respective partitions of a plurality of sectors. The interleaver 142 may aggregate the segments of the codewords for subsequent decoding to provide user data.

The interleave indices 144 may indicate how to interleave respective segments of codewords across a plurality of sectors, such as media track or recording track sectors. In some cases, the interleave indices 144 are used to load or place codeword segments into the interleaver 142 or an interleave buffer. In other cases, the interleave indices 144 are useful to mask or block a read gate to selectively read codeword segments from corresponding sector partitions. The buffered timing recovery circuit 146 may enable reading and decoding of codeword segments through timing interpolation to adjust a phase of data samples read back from the sectors of the media track. Due to the reduced size of the codeword segments, a short synchronization mark may be used to indicate a start or position of a codeword segment. In some cases, buffering read back data samples while a phase of a synchronization sequence or preamble is determined allows the use of a short (e.g., less than 40 to 50 bit clocks) synchronization mark in the codeword segments. How the interleaver 142, interleave indices 144, and buffered timing recovery circuit 146 are implemented and used varies and is described throughout this disclosure.

Figure 2:
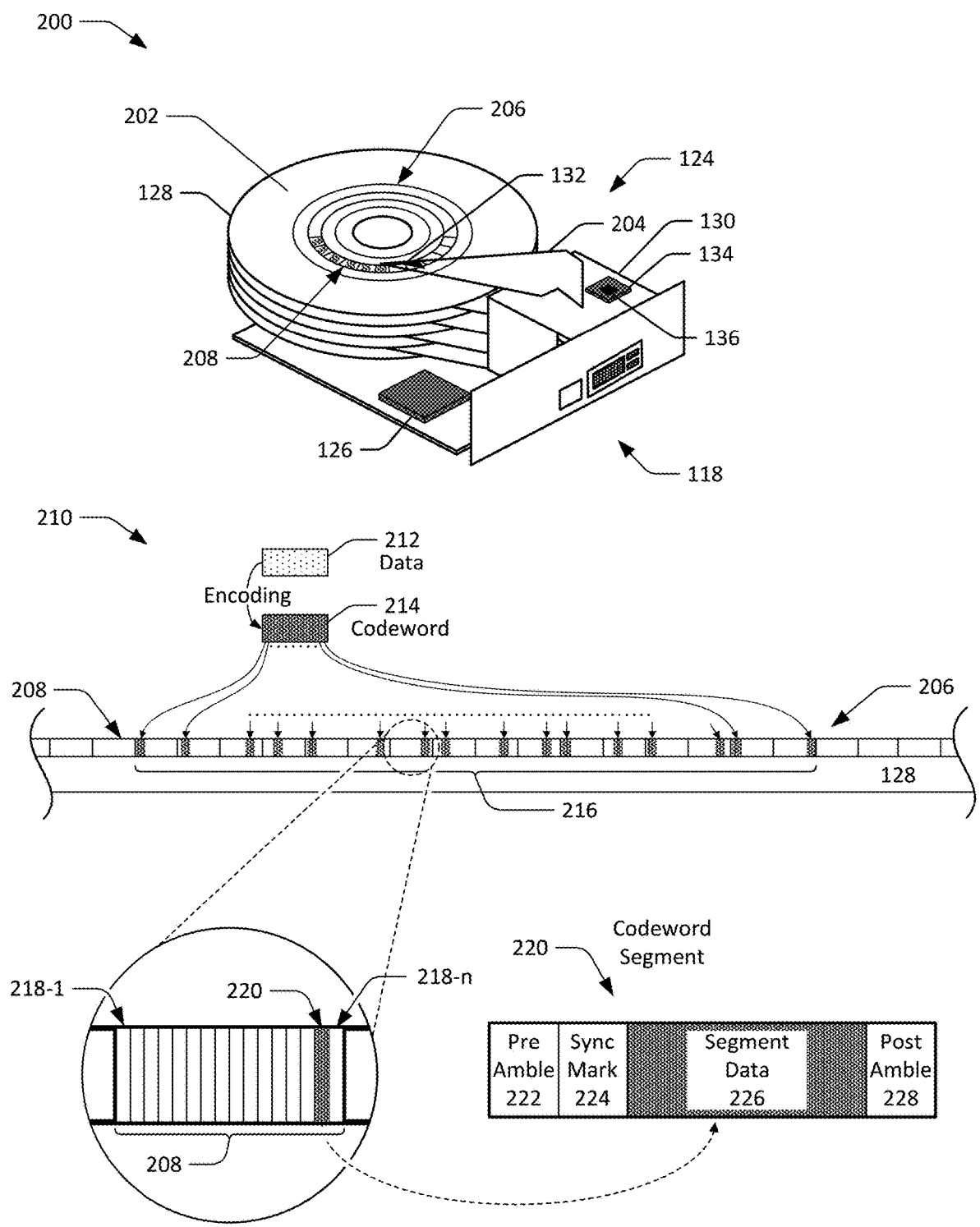
FIG. 2 illustrates an example configuration of the hard-disk drive shown in FIG. 1.

FIG. 2 illustrates at 200 an example configuration of the hard-disk drive 118 shown in FIG. 1. As shown in FIG. 2, the HDA 124 of the hard-disk drive 118 includes an integrated spindle and motor assembly 130 by which media disks 128 of magnetic media 202 are supported and/or operated, in an embodiment. An arm 204 may maneuver, and thus position a read/write head 132 (or multiple read/write heads 132) over a desired track 206 of the magnetic media 202 on the media disk 128. Generally, the read/write head 132 may include various numbers of head elements with combined or separate functions (e.g., dedicated R/W functions). For example, the read/write head 132 may include one or more readers (read heads/elements) and one writer (write head/element). In other cases, the read/write head 132 may include a dedicated write head (element) and one or more separate, additional dedicated read heads (elements). Alternatively or additionally, although multiple arms 204 are shown in FIG. 2, the HDA 124 or spindle and motor assembly may be implemented with a single arm 204 or other suitable structures for positing the read/write head 132. The HDA 124 and the drive control module 126 may be implemented separately, on separate substrates, and/or as separate PCBAs of a media drive. Signals or data communicated between the HDA 124 and the drive control module 126 may be carried through a flexible printed cable or other suitable connective structures, such as traces, connectors, bond wires, solder balls, or the like.

FIG. 2 also includes an illustration of example sectors 208 configured to store codeword segments that are written to the magnetic media 202 of a media disk 128. One or more of the read/write heads 132 may write user data or codewords to respective sectors 208 of the tracks 206 of a media disk 128 (e.g., a sector of track 206). For illustrative purposes, a top media disk 128 is shown to include tracks 206, for example, after being written with sectors 208 of codewords by a read/write head 132. Generally, during write operations, the read/write head 132 may be driven by a write current provided by the pre-amp/writer 134, whereby an electrical signal is used to generate and/or transfer magnetic fields having associated polarities of encoded bits to the media disk 128. In response to application of the magnetic fields or write fields, the read/write head 132 may form a plurality of magnets in magnetic grains of the sectors 208 of the media disk 128 that correspond to the encoded codewords of data (e.g., user data). The HDA 124 of the hard-disk drive 118 may be configured to perform write operations in accordance with any suitable recording technology, such as perpendicular magnetic recording (PMR), shingled magnetic recording (SMR), heat-assisted magnetic recording (HAMR), microwave assisted magnetic recording (MAMR), or the like.

As shown at 210, a sector of data 212 may generally correspond to a sector 208 of magnetic media 202. In aspects of codeword interleaving, the sector of data 212 is encoded to provide a codeword 214 of encoded data. In some cases, the data is encoded by the read/write channel 140 with an error correction coding (ECC) to provide codewords that reduce errors in data storage and transmission by introducing data redundancy into a data channel, such as in the form of extra bits that useful to verify the validity of the original data. Examples of error correcting codes employed by the read/write channel 140 or interleaver 142 include Reed-Solomon (RS), Bose, Ray-Chaudhuri, Hocquenghem (BCH), low-density parity-check (LDPC), Turbo codes, polar codes, linear block codes, or any other suitable error correcting code.

In this example, the codeword 214 is split or divided into 16 segments of the codeword, which may also be referred to as codeword segments. Here, assume that a storage media controller 136 has assigned 16 sectors 208 of a media track 206 to an interleaver group 216 or a plurality of sectors to which segments of one or more codewords are spread. Alternatively or additionally, each sector 208 may be divided or partitioned into any suitable number of partitions 218-1 through 218-n, where n is any suitable integer. As shown in FIG. 2, the codeword 214 is divided into segments 220, which are written across the 16 sectors of the interleaver group 216. Although illustrated as being written to consecutive or contiguous sectors 208 of the interleaver group 216, the codeword segments may also be written to non-consecutive or noncontiguous sectors 208, such as to spread the codeword across a greater number of sectors 208.

In some aspects, a codeword segment 220 includes a pre-amble 222, synchronization mark 224 (sync mark 224), segment data 226 (e.g., encoded user data), and a post-amble 228. To conserve or reduce access overhead, the codeword segment 220 may be implemented with a pre-amble 222 and sync mark 224 configured for use with a buffered timing recovery circuit 146. Generally, this may enable the use of a shorter synchronization sequence in the pre-amble 222 and sync mark 224 through the buffering of data samples while at least a portion of phase computation is performed for the synchronization sequence. By so doing, a phase of the buffered data samples may be adjusted for sync mark identification after the phase is determined (e.g., in parallel), rather than delaying a read of a sync mark until after phase is determined while reading a synchronization sequence. In some cases, this enables the codeword segments 220 to be implemented with a synchronization sequence that is shorter (e.g., less than 40 to 50 bit clocks) than those used for conventional codeword writing (e.g., approximately 100 bit clocks in length).

Figure 3:
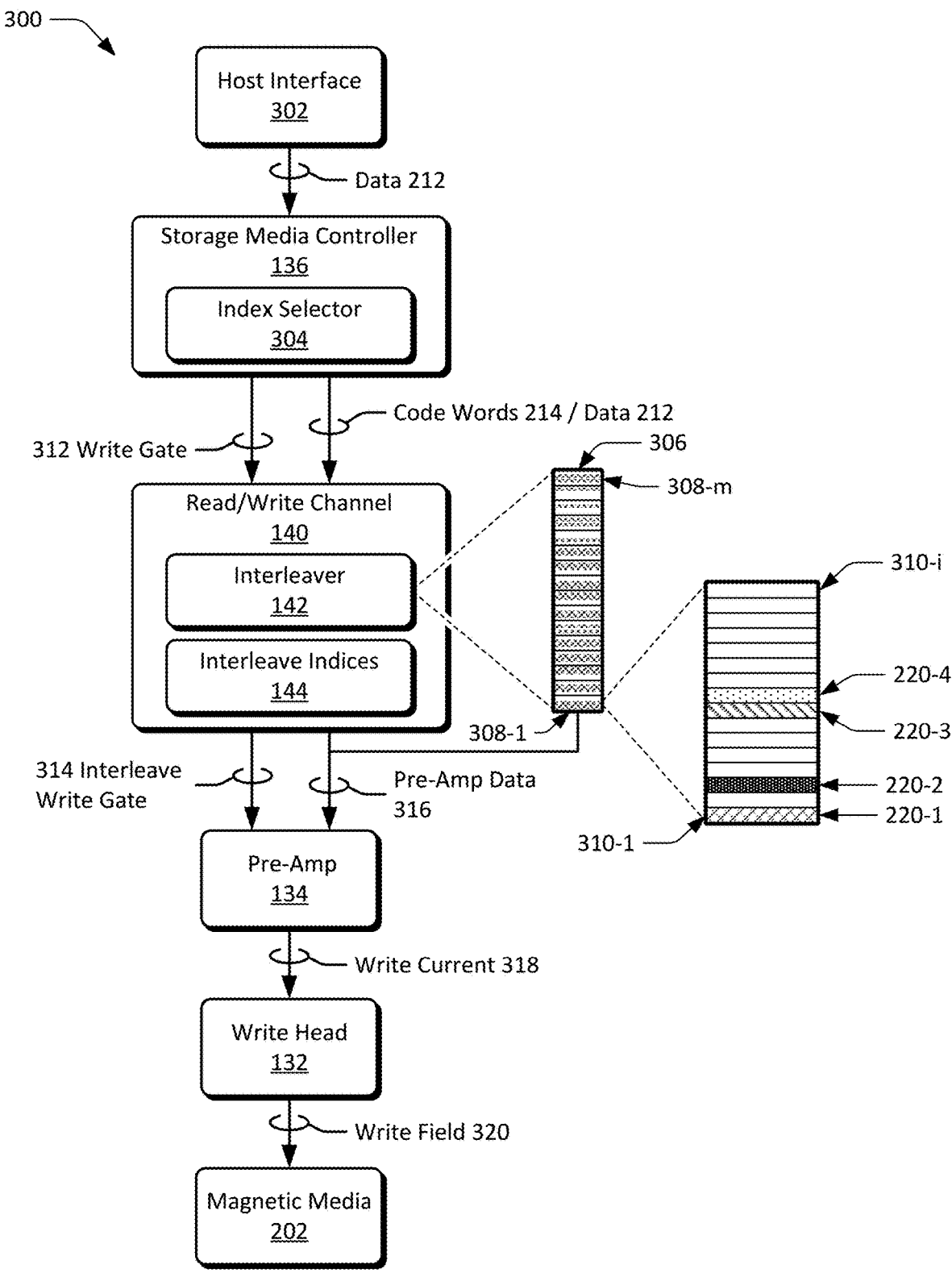
FIG. 3 illustrates example configurations of a read/write channel and interleaver, which may write codeword segments to the sectors of magnetic storage media shown in FIG. 2.

FIG. 3 illustrates example configurations of a read/write channel and interleaver generally at 300, which may write codeword segments in accordance with one or more aspects of codeword interleaving for magnetic storage media. In this example, the interleaver 142 is operably coupled with the read/write channel 140, which also includes an instance of interleave indices 144. Although shown in FIG. 3 as separate components or circuitry, the interleaver 142 and interleave indices 144 may be integrated as one component, separated among other components of the hard-disk drive 118, and/or integrated with other microelectronics or circuitry of the read/write channel 140 or storage media controller 136. For example, in some aspects, the storage media controller 136 may include the interleaver 142 and interleave segments of codewords for writing across sectors of magnetic storage media.

As shown in FIG. 3, a host interface 302 may provide data 212 (e.g., user data) or other information to the storage media controller 136 for writing to the magnetic media 202. In some aspects, the storage media controller 136 or the interleaver 142 assigns a set of physical media sectors 208 on which to write one or more interleaved codewords 214. For example, 16 consecutive sectors 208 may be assigned for writing 16 interleaved codewords 214. The storage media controller 136 may provide data 212 to the read/write channel 140 for one or more of the codewords for writing to the sectors 208 of the media track 206. As described herein, data 212 for a codeword 214 may also be referred to as a sector of user data. Alternatively or additionally, the storage media controller 136 may encode the data 212 and provide the codewords 214 to the read/write channel 140.

In some aspects, the storage media controller 136 also provides information regarding which codeword interleaves are to be used to interleave and write the codeword segments 220 to the sectors 208 of the media track 206. For example, when 16 sectors are assigned or configured as an interleaver group, if four interleaved codewords 214 are sent to the read/write channel 140, the storage media controller 136 may provide this information to the interleaver 142 as how to interleave segments of the four codewords 214 to or across the 16 sectors 208 of the media track 206. This information may include interleave indices 144 or indicators, which specify how a codeword 214 is interleaved among the sectors 208 of an interleaver group. The interleave indices 144 may include pre-defined indices or indicators, which may be known to one or both of the storage media controller 136 or read/write channel 140, such that an interleave index 144 may be referenced by a unique index identifier (e.g., 0, 1, . . . 14, 15). In this example, the storage media controller 136 includes an interleave index selector 304 (index selector 304), which may be configured to select a respective interleave index 144 for a codeword 214 sent to the read/write channel 140. In the context of the present example, the index selector 304 would select a different interleave index for each of the four codewords 214 to be interleaved and written to the 16 sectors 208 of the interleaver group.

Generally, the read/write channel 140 may receive a sector of data 212, encode the data 212 as a codeword 214, and provide the codeword 214 to the interleaver 142. In this example, the interleaver 142 includes a configurable interleave buffer 306 into which segments of the codewords 214 are placed by the interleaver 142 based on a respective interleave index 144 that corresponds to the codeword. Although illustrated here as a buffer, the interleaver 142 may include any suitable data structure to receive interleaved codeword segments 220 placed by the interleaver 142 for writing to respective sectors of an interleaver group.

The interleave buffer 306 may be divided or include any suitable number of sections 308-1 through 308-m, where m is any suitable integer. In this example, the interleave buffer 306 includes 16 sections, which may correspond to 16 codewords or 16 sectors of media track. In other words, the interleaver 142 or interleave buffer 306 may be configured based on a size of an interleaver group (e.g., assigned sectors) or a number of codewords to be written to the interleaver group. Alternatively or additionally, each section 308 of the interleave buffer 306 may be divided into or include partitions 310-1 through 310-i, where i is any suitable integer. In some cases, the number of partitions 310 of a section 308 corresponds to a number of slots or partitions (e.g., sector partitions) that one or more sectors 208 of the interleaver group include. In this example, the sections 308 of the interleave buffer 306 may each include 16 partitions 310 to buffer or store 16 codeword segments 220.

By way of example, assume that the storage media controller 136 provided data 212 for four codewords 214 and four respective interleave indices 144 for each of the codewords. In some aspects, the read/write channel 140 takes a first sector of data 212, encodes the data 212 to provide a first codeword 214, and the interleaver 142 places segments 220 of the first codeword 214 into the interleave buffer 306 based on a first interleave index 144. The read/write channel 140 may then take a second sector of data 212, encode the data 212 to provide a second codeword 214, and the interleaver 142 places segments 220 of the second codeword 214 into the interleave buffer 306 based on a second interleave index 144. The read/write channel 140 and interleaver 142 may repeat these operations for the third and fourth codewords 214 as well, to interleave segments of the four codewords in the interleave buffer 306. As shown in FIG. 3, a first section 308-1 of the interleave buffer 306 may include codeword segments 220-1 through 220-4, which are placed into partitions or slots of the section 308 based on the interleave indices 144. Thus, respective segments of the four codewords 214 may be placed into or across the 16 sections 308 of the interleave buffer 306 based on the interleave indices 144 received with the data 212 for the codewords 214.

To write the codeword segments 220 from the interleaver 142, the storage media controller 136 may provide a write gate signal 312 (write gate 312 or write signal) to the read/write channel 140. The storage media controller 136 may provide a write gate 312 for each sector 208 of the media track 206, to indicate a start or position of the physical sector to the read/write channel 140. Alternatively or additionally, the read/write channel 140 or interleaver 142 may determine a location index for a codeword 214 for where the segments of the codeword are to be written to respective partitions of the sectors of the interleaver group. In some cases, the read/write channel 140 or interleaver 142 determines, based on the location index, that one of the segments of the codeword is to be written to one of the partitions of the sector and then writes the segment based on the write signal and the location index. In other cases, the read/write channel 140 or interleaver 142 determines, based on the location index, that one of the segments of the codeword is not to be written to one of the partitions of the sector and blocks the write signal to prevent writing of the partition of the sector.

In some aspects, the read/write channel 140 may manage or block the write gate 312 provided by the storage media controller 136 to generate an interleave write gate signal 314 (interleave write gate 314) for the pre-amp 134 of the media drive. The read/write channel 140 or interleaver 142 may also provide, to the pre-amp 134, the codeword segments 220 from the interleave buffer 306 as pre-amp data 316, which may include a signal corresponding to data patterns of the codeword segments. Based on the interleave write gate 314 and pre-amp data 316, the pre-amp 134 generates or provides a write current 318 to the write head 132 of the media drive to write the interleaved codeword segments 220 to sectors 208 of the magnetic media 202.

The write current 318 generated by the pre-amp 134 may then be provided to a corresponding write head 132 for the magnetic media 202. Based on the write current 318, the write head 132 may selectively generate a magnet write field 320 to form magnets in the sectors 208 of the media track 206 that correspond to interleaved codeword segments 220. Alternatively or additionally, the storage media controller 136 may control the write gate 312 or interleave write gate 314 for each codeword segment written to the magnetic media 202. To do so, the read/write channel 140 may provide information regarding a length of each codeword segment 220 to be written from the interleaver 142. As such, it may be advantageous to allow the read/write channel 140 to control the writing of the interleaved codeword segments 220 because the write process would not pause or delay when writing codeword segments 220 to consecutive partitions of a sector 208 of the media track 206.

In some aspects, the storage media controller 136 may provide one or more codewords that belong to a same interleaver group to the read/write channel 140. The storage media controller 136 may also provide, such as along with the codewords, an index for each codeword indicating where the codeword belongs in the interleaver group and/or how to interleave segments of the codewords with respective segments of other codewords in the interleaver group. For example, in an interleaver group of size 16 (sectors or codewords), each codeword provided by the storage media controller 136 to the read/write channel 140 may be given a unique index (e.g., 0, 1, . . . 14, 15) by the index selector 304 to indicate to the read/write channel 140 where (e.g., which interleave pattern) to populate the interleaver 142 with the codeword. The unique index may also be useful to the read/write channel 140 to generate a location index for where to write the segments of the codeword within one or more sectors of the interleaver group.

Based on the interleave indices 144 (or unique index) provided by the index selector 304 for the codewords, the read/write channel 140 may place or insert the codewords into the interleaver 142. The storage media controller 136 may generate write gate 312 for each physical sector 206 on the media track 206 within the interleaver group. In response to the write gate 312, the read/write channel 140 may determine, based on the location index, if a codeword segment is to be written to a partition of the sector. When there is no codeword segment to write, the read/write channel 140 may block the write gate 312 until a next sector partition to prevent overwriting of existing data in the sector. At a next sector partition, the read/write channel 140 checks again to see if there are any codeword segments to write. When there is a codeword to write to the partition of the sector, the read/write channel 140 may unblock the write gate 312 to write the codeword segment together with a pre-amble, synchronization mark, and/or post amble. The read/write channel 140 or interleaver 142 may continue processing the codeword segments in similar fashion until the writing of the interleaver group is complete.

Figure 4:
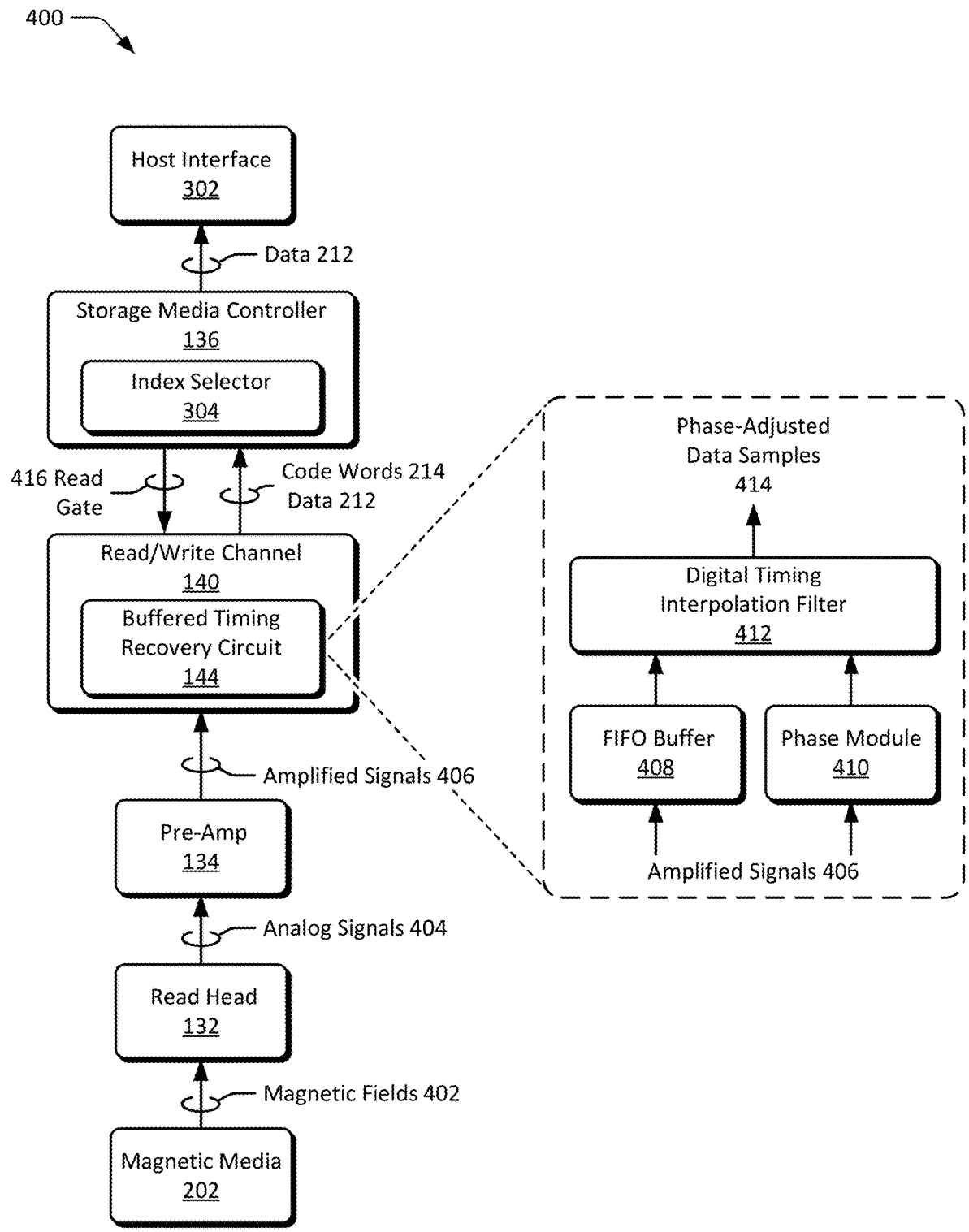
FIG. 4 illustrates example configurations of a read/write channel and timing recovery circuit, which may read codeword segments from the sectors of magnetic storage media shown in FIG. 2.

FIG. 4 illustrates example configurations of a read/write channel and timing recovery circuit generally at 400, which may read codeword segments in accordance with one or more aspects of codeword interleaving for magnetic storage media. In this example, an instance of a buffered timing recovery circuit 146 is operably coupled with the read/write channel 140 of a media storage drive. Although shown in FIG. 4 as separate components or circuitry, the read/write channel 140 and buffered timing recovery circuit 146 may be integrated as one component, separated among other components of the hard-disk drive 118, and/or integrated with other microelectronics or circuitry of the pre-amp 134, storage media controller 136, and/or the read/write channel 140.

In this example, the read/write channel 140 and other components are described in the context of reading codeword segments 220 from sectors of the magnetic storage media 202 (magnetic media 202). For example, a host system or computing device 102 may issue a read command for data stored as interleaved codeword segments that are spread across multiple sectors 208 of the media disk 128. Generally, as the media disk 128 rotates under the read head 132, the read head 132 senses magnetic fields 402 of codeword segments 220 stored to the magnetic media 202, which induce analog signals 404 at the read head 132. The pre-amplifier 134 (pre-amp 134) amplifies the analog signals 404 received from the read head 132 and provides amplified signals 406 to the read/write channel 140.

In various aspects, the read/write channel 140 conditions and samples the amplified signals 406 (e.g., a read-back continuous time signal) provided by the pre-amp 134 to readback the codeword segments 220. To facilitate the reading of a codeword segment 220 independently from other codeword segments of a sector, each codeword segment 220 may include a synchronization sequence. By so doing, a readback circuit of the read/write channel 140 may identify a proper start of a codeword segment within a sector or partition of the sector. In some aspects, the buffered timing recovery circuit 146 is used by the read/write channel 140 to properly synchronize with each codeword segment during readback.

In this example, the buffered timing recovery circuit 146 of the read/write channel 140 includes a first-in-first-out (FIFO) buffer 408, phase module 410, and digital timing interpolation filter 412. Generally, with the buffered timing recovery circuit 146 and digital timing recovery, which may also be referred to as interpolated timing recovery, data samples provided by amplified signals 406 of the read/write channel 140 may be buffered in the FIFO buffer 408 at least partially in parallel with computation of a phase for a synchronization sequence by the phase module 410 based on a read signal (e.g., amplified signals 406). In some aspects, data on the media disk is written as a preamble followed by an address mark and then encoded user data. The preamble, address mark, and encoded user data may be received by the read/write channel as the amplified signals 406. The phase module 410 may use the pre-amble part of the read signal to calculate a phase offset to initialize a correct phase in the digital timing interpolation filter. While the phase module calculates the phase, the remaining read signals may be buffered into the FIFO buffer 408. When the phase is calculated, the data in the FIFO buffer 408 then passes through the digital interpolation filter 412 for phase adjustment or correction. The digital timing interpolation filter 412 may then adjust, based on the phase determined by the phase module 410, a phase of the data samples to provide phase-adjusted data samples 414. By so doing, the use of a long synchronization sequence can be avoided, as there is no need to continuously receive a synchronization sequence while the phase is being calculated.

The read/write channel 140 may identify a synchronization mark of the codeword segment in the phase-adjusted samples 414, as well as acquire timing lock and/or lock control loops to readback the codeword segment 220. In some cases, the read/write channel 140 aggregates segments of the codeword 214 and provides the codeword 214 to the storage media controller 136. In other cases, the read/write channel 140 may decode the codeword 214 and provide the data 212 to the storage media controller 136. Thus, the read/write channel 140 may convert the phase-adjusted data samples or other sampled signals into a digital signal and recover decoded data 212, which is provided to the storage media controller 136. Although not shown, the read/write channel 140 may include any suitable combination of an equalizer module, a detector module, an adaptation module, or a gain module for detection, equalization, and/or decoding of data 212 from signals received from the pre-amp 134.

In some aspects, the storage media controller 136 enables the read back of segments 220 of one or more codewords by providing the interleave indices 144 for the codewords to be read back. For example, for a given interleaver group of codewords or for a subset of the group, the index selector 304 of the storage media controller 136 may provide interleave indices for the codewords of the interleaver group to be read back (e.g., 0, 1, 2, . . . 14, 15). In some cases, the read/write channel 140 may generate, based on the interleave indices, respective location indices (e.g., physical locations in the sectors) for those segments 220 of codewords that will be read back.

To facilitate read back of the codeword segments, the storage media controller 136 may also generate a read gate signal (read gate 416 or read signal) indicating a start or position of one or more physical sectors on the media. In response to the read gate 416, the read/write channel 140 may determine, based on the location index, if a codeword segment is to be read from a partition of the sector. When there is no codeword segment to read, the read/write channel 140 may block the read gate 416 until a next sector partition to prevent reading of an unintended codeword segment. At a next sector partition, the read/write channel 140 may check again to see if there are any codeword segments to read. When there is a codeword to read to the partition of the sector, the read/write channel 140 may unblock the read gate 416 to read the codeword segment, which may also include a pre-amble, synchronization mark, and/or post amble. The read/write channel 140 or interleaver 142 may continue processing the codeword segments in similar fashion until the reading of the interleaver group or subset of the interleaver group is complete.

Techniques of Codeword Interleaving for Magnetic Storage Media

The following discussion describes techniques of codeword interleaving for magnetic storage media, which may improve data storage reliability or enable data access across degraded media sectors. These techniques may be implemented using any of the environments and entities described herein, such as the read/write channel 140, interleaver 142, interleave indices 144, or buffered timing recovery circuit 146. These techniques include methods illustrated in FIGS. 5 and 7-9, each of which is shown as a set of operations performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, aspects of the methods described may be combined to implement codeword interleaving for magnetic media for writing and/or reading one or more interleaved codewords across multiple sectors of magnetic storage media. In portions of the following discussion, reference will be made to the operating environment 100 of FIG. 1, entities of FIGS. 2, 3, and/or FIG. 4. Such reference is not to be taken as limiting described aspects to the operating environment 100, entities, configurations, or implementations, but rather as illustrative of one of a variety of examples. Alternatively or additionally, operations of the methods may also be implemented by or with entities described with reference to the System-on-Chip of FIG. 10 and/or the storage media controller of FIG. 11.

Figure 5:
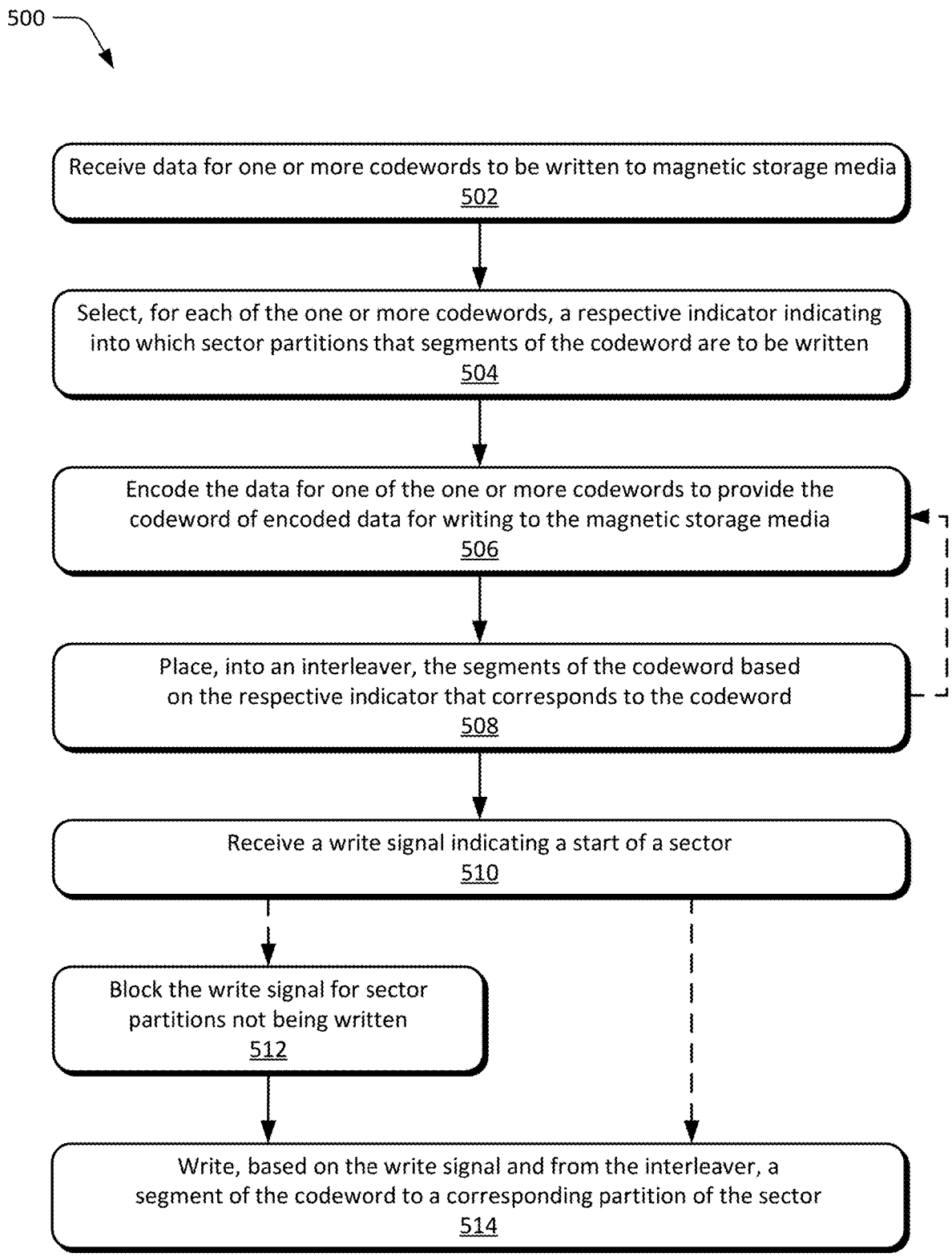
FIG. 5 depicts an example method for writing interleaved codeword segments to sectors of a media track in accordance with one or more aspects.

FIG. 5 depicts an example method 500 for implementing codeword interleaving of magnetic storage media, including operations performed by or with the read/write channel 140, interleaver 142, and/or interleave indices 144.

At 502, data for one or more codewords is received. The data may correspond to codewords that are to be written to or across respective sectors of a media track or magnetic storage media. In some cases, the data is unencoded data or user data received from a host or storage media controller. Data for a codeword may also be referred to or correspond to a sector of user data or a quantity of data to write to a sector of the media track. In other words, a "sector" of user data may include an amount of user data that corresponds to an approximate size of a physical sector of media track or recording media. By way of example, assume that a storage media controller has assigned six sectors of media track to an interleaver group and has received four sectors' worth of user data from a host. A read/write channel may receive the four sectors of user data from the host or data for encoding four codewords to interleave across the six sectors of the interleaver group. Alternatively, data for one codeword may be received, such that method 500 is implemented to write segments of one codeword across sectors of an interleaver group.

At 504, for each of the one or more codewords, a respective index is selected that indicates which sector partitions that segments of the codeword are to be written. The index may include an interleave index, which may be pre-defined or referenced by a unique index (e.g., 0, 1, . . . 14, 15). In some cases, an indication of the respective index is received, enabling the selection of the respective index for a codeword. In the context of the present example, the read/write channel may receive unique references to four interleave indices (e.g., 0, 1, 3, and 4) for the four sectors (or codewords) of user data.

Figure 6:
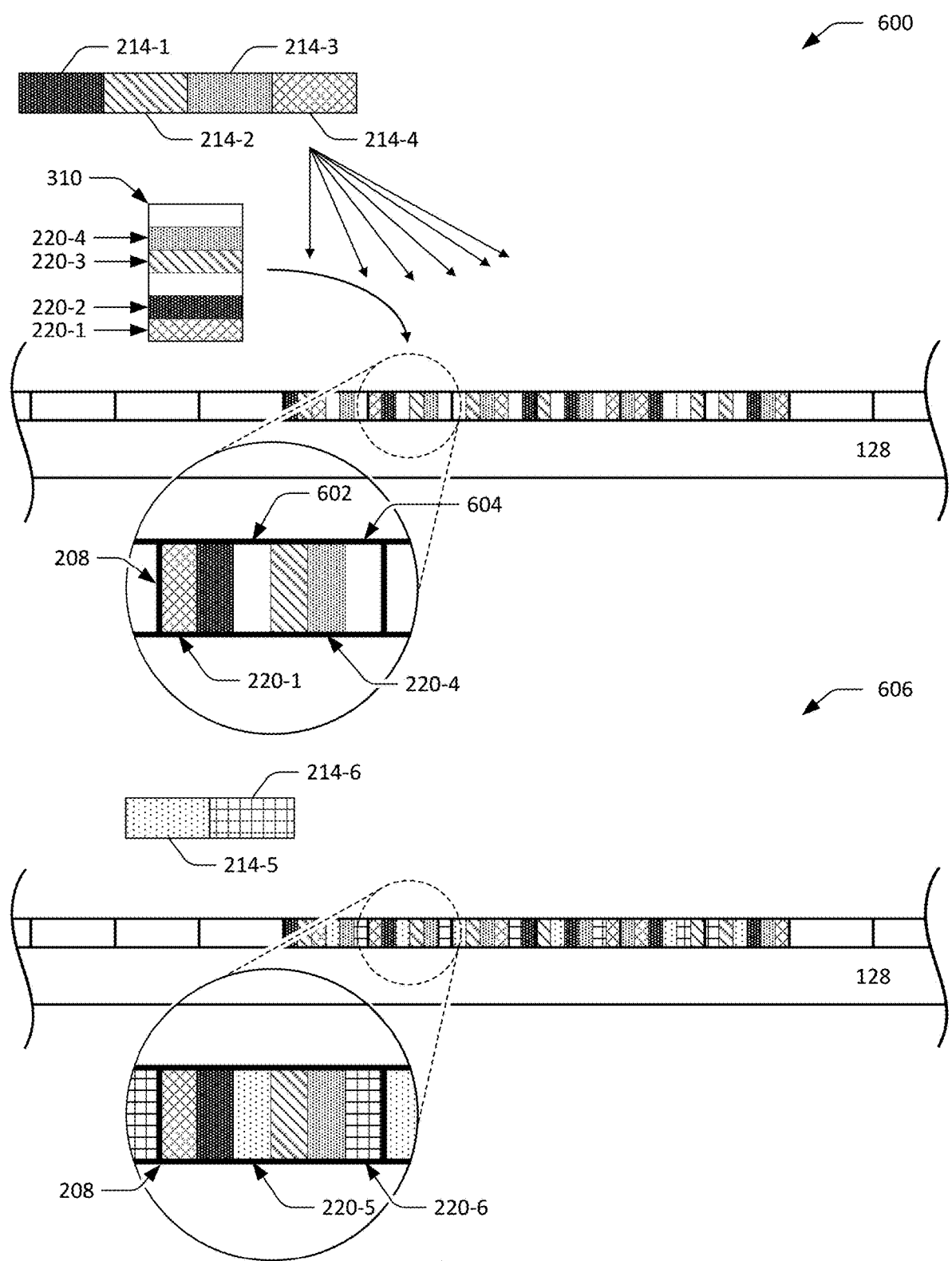
FIG. 6 illustrates an example media track of sector partitions to which interleaved codeword segments are written in accordance with one or more aspects.

At 506, data for one of the codewords is encoded to provide the codeword of encoded data for writing to the magnetic storage media. In some cases, the data may be encoded with an error correction coding (ECC) to provide the codewords. The ECC may include one of a Reed-Solomon (RS), Bose, Ray-Chaudhuri, Hocquenghem (BCH), low-density parity-check (LDPC), Turbo codes, polar codes, or another error correcting code. By way of example, consider FIG. 6 which illustrates at 600 an example of codewords and media track of sector partitions to which interleaved codeword segments are written in accordance with one or more aspects. Continuing the ongoing example, the read/write channel encodes data of a first sector of user data to provide a first codeword 214-1. The encoding may also be repeated to provide the second, third, and fourth codewords 214-1, 214-2, and 214-3 as shown in FIG. 6.

At 508, segments of the codeword are placed into an interleaver based on the respective index that corresponds to the codeword. The codewords may be divided or split into segments of approximately a same size or that correspond to a size of sector partition to which the segments are to be written. In some cases, a size of the segments is configured based on a size of an interleaver group (e.g., number of sectors) and codeword density of that interleaver group, such as a total number of codewords to be written across sectors of the interleaver group.

Optionally, from operation 508, the method 500 may return to operation 506 to encode the data another or a next codeword of the one or more codewords. By so doing, operations 506 and/or 508 may be repeated until each of the one or more codewords is encoded and the respective segments of each codeword placed into the interleaver. In the context of the present example illustrated in FIG. 6, the interleaver places segments 220 of the codewords 214 into respective slots of an interleave buffer partition 310. As described herein, the interleaver or read/write channel may place the codeword segments 220-1 through 220-4 into corresponding slots of the interleave buffer partition 310 based on an interleave index associated with or corresponding to each of the codewords 214.

At 510, a write signal indicating a start of a sector or sector partition is received. In some cases, the write signal and a location index for segments of the codeword may be used to determine which sector partitions to write the segments of the codeword. Optionally at 512, the write signal may be blocked for sectors or partitions to which a codeword segment is not to be written.

At 514, a segment of the codeword is written to a corresponding partition of the sector of magnetic storage media. Based on the location index for segments of the codeword, the segments may be written from the interleaver or interleave buffer as the write head encounters the sectors of the interleaver group. The respective segments of the one or more codewords may be written in-order or out-of-order. For example, an interleave buffer or interleaver block may be populated with respective interleaved segments of multiple codewords (e.g., codewords 214-1, 214-2, . . . 214-14, and 214-15). A user, storage media controller, or read/write channel may write fewer than all of the interleaved codewords and/or in any suitable order. In some cases, the user may write codewords 214-9 and 214-12 during a first write operation or sequence. The user may then proceed to write other codewords in any suitable order and/or in any number of write operations or sequences. In other words, a first received or populated codeword (e.g., 214-1) may not be a first codeword of segments written to respective sector partitions in the magnetic storage media. In some cases, codeword segments may be written to all partitions or slots of a physical sector. In other cases, codeword segments may be written to a subset of the partitions or slots of a physical sector.

Concluding the present example, the four codeword segments 220-1 through 220-4 are written from the interleaver to partitions or slots of the second sector 208 of the interleaver group. Here, note that the read/write channel may block the write signal at 602 and 604 where codeword segment is not written during the interleaved write operation. At 606 of FIG. 6, assuming that the storage media controller provides data for two additional codewords 214-5 and 214-6, the read/write channel and interleaver may implement a subsequent interleaved write operation to write codeword segments 220-5 and 220-6 to other slots or partitions of the interleaver group sectors. To prevent overwriting of the previously written codeword segments 220-1 through 220-4, the read/write channel may block the write signal when encountering these sector partitions or slots of the interleaver group.

Figure 7:
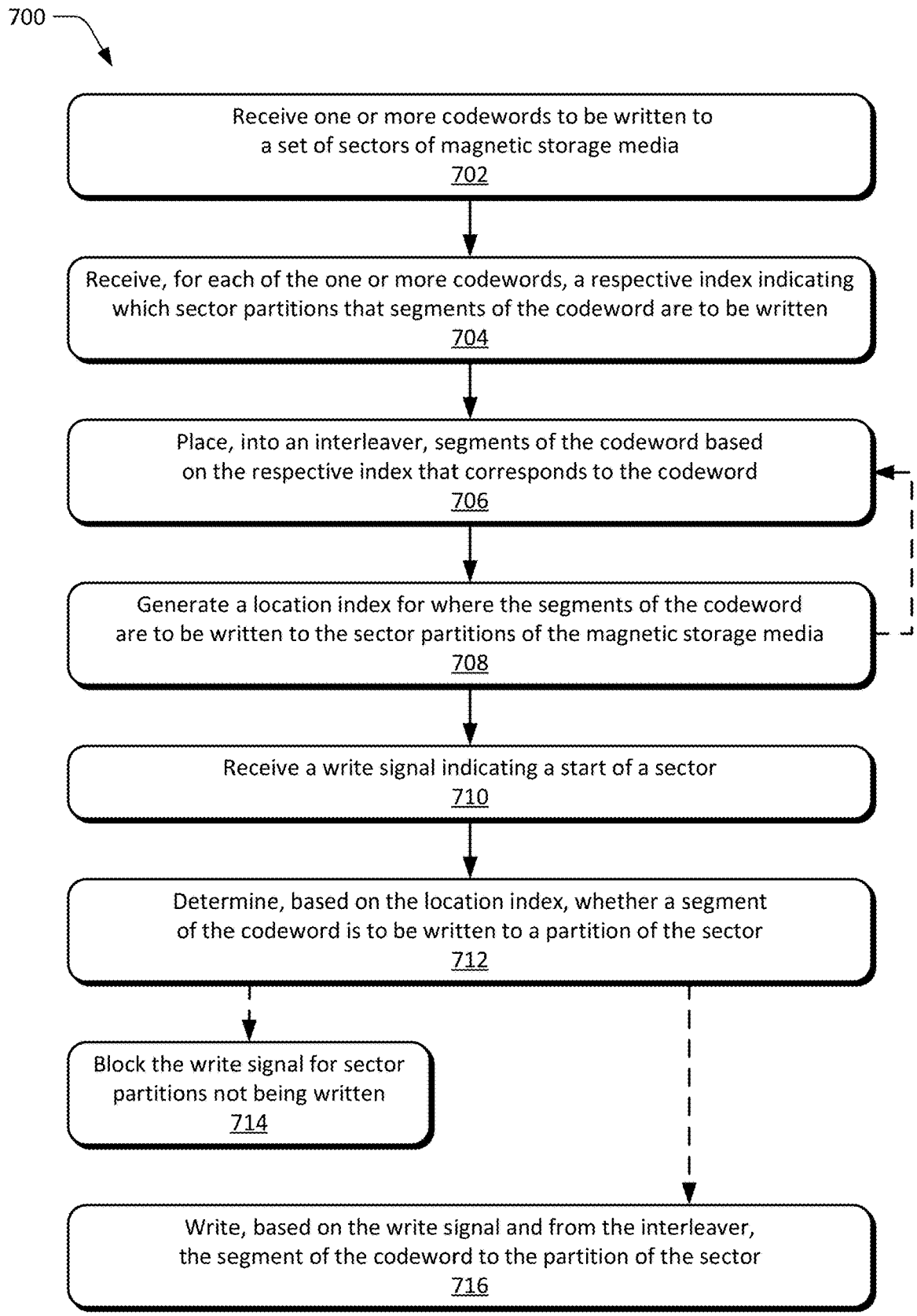
FIG. 7 depicts an example method for interleaving codewords and writing segments of the interleaved codewords to respective sector partitions of magnetic storage media.

FIG. 7 depicts an example method 700 for writing codeword segments from an interleaver to respective sector partitions of magnetic storage media. The operations of method 700 may be performed by or with the read/write channel 140, interleaver 142, and/or interleave indices 144. Alternatively, one codeword may be received, such that method 700 is implemented to write segments of the one codeword across sectors of an interleaver group.

At 702, one or more codewords are received. The one or more codewords are to be written to a set of sectors of magnetic storage media. In some cases, the codewords are encoded data that corresponds to sectors of user data. The codewords may be received from a storage media controller. A size of the codeword may correspond to an amount of data in a sector of user data or a quantity of data to write to a sector of the media track.

At 704, for each of the codewords, a respective index is received that indicates which sector partitions that segments of the codeword are to be written. The index may include an interleave index, which may be pre-defined or referenced by a unique index (e.g., 0, 1, . . . 14, 15). In some cases, an indication of the respective index is received, enabling selection of the respective index for a codeword.

At 706, the segments of the codeword are placed into the interleaver based on the respective index that corresponds to the codeword. The codewords may be divided or split into segments of approximately a same size or that correspond to a size of sector partition (or sector slot) to which the segments are to be written. In some cases, a size of the segments (e.g., $1/16^{th}$ of a sector) is configured based on a size of an interleaver group (e.g., number of sectors (16)) and codeword density of that interleaver group, such as a total number of codewords (16) to be written across sectors of the interleaver group.

At 708, a location index (or indicator) is generated for a codeword for where the segments of the codeword are to be written to the sector partitions of the magnetic storage media. In some cases, a location index is generated for the segments of a codeword based on an interleave index that corresponds to the codeword. Alternatively or additionally, the location index may be determined based on position of a codeword within an interleaver or interleave buffer.

Optionally, from operation 708, the method 700 may return to operation 706 to place segments of another codeword into the interleaver and/or determine a location index for segments of the codeword. By so doing, operations 706 and/or 708 may be repeated until each of the one or more codewords is encoded, indexed via physical location, and the respective segments of the codeword placed into the interleaver.

At 710, a write signal indicating a start (or position) of a sector is received. The write signal may be received from a storage media controller to indicate the start of a sector or a start of each physical sector of a media track. At 712, a determination is made as to whether a segment of the codeword is to be written to a partition of the sector. In some cases, the determination is made based on a location index of the codeword that indicates where to physically write segments of the codeword to respective sector partitions or sector slots on the media track.

Optionally at 714, in response to determining that a codeword segment will not be written to the sector partition, the write signal is blocked. This may prevent over-writing of a codeword segment that resides on the sector partition. Optionally at 716, the segment of the codeword is written from the interleaver to the partition of the sector based on the write signal and/or a location index for segments of the codeword.

Figure 8:
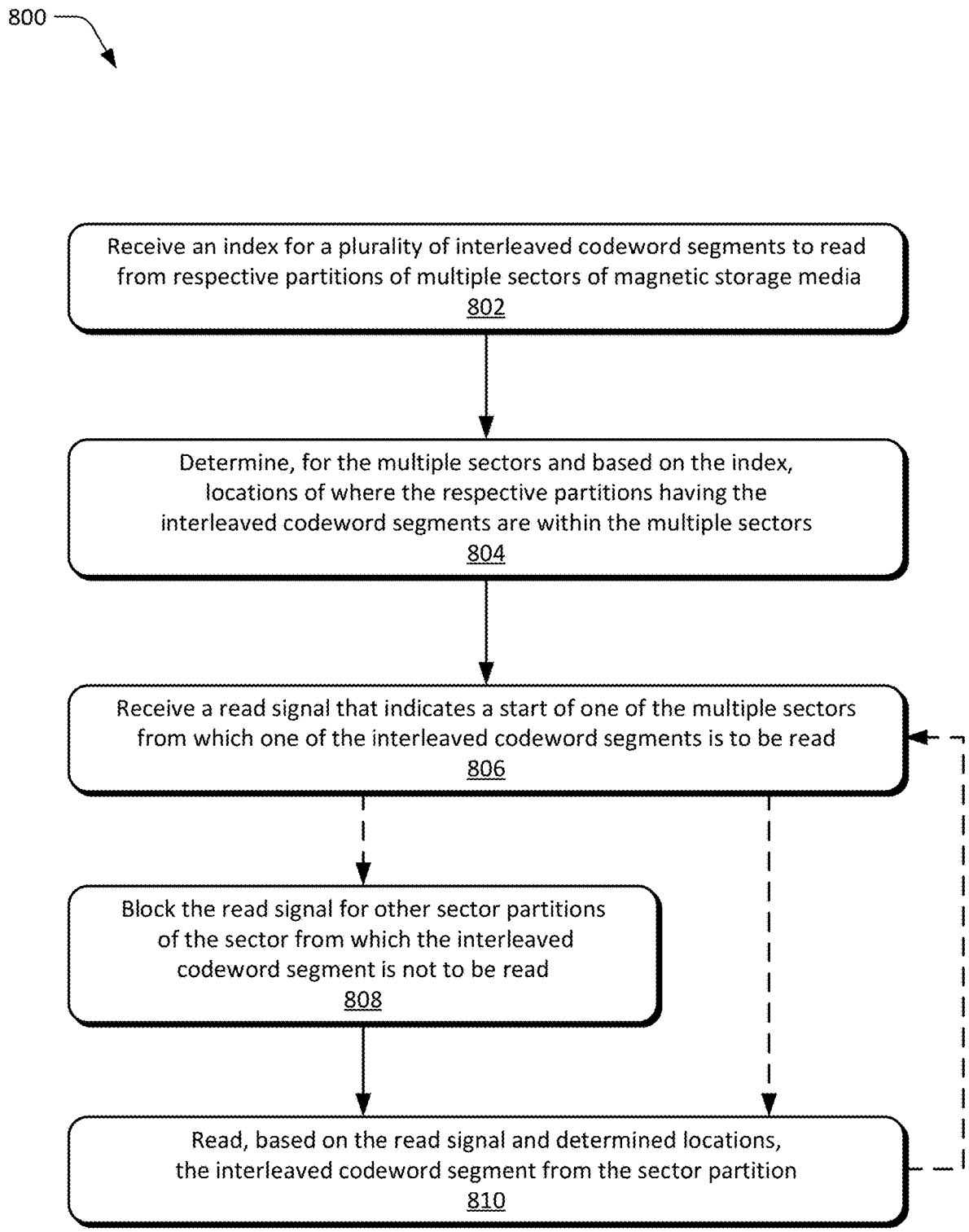
FIG. 8 depicts an example method for reading interleaved codeword segments for a plurality of codewords from respective sector partitions of magnetic storage media.

FIG. 8 depicts an example method 800 for reading interleaved codeword segments from respective sector partitions of magnetic storage media. The operations of method 800 may be performed by or with the read/write channel 140, interleaver 142, interleave indices 144, and/or the buffered timing recovery circuit 146.

At 802, an index for a plurality of interleaved codeword segments to read is received. The plurality of interleaved codeword segments is to be read from respective partitions of multiple sectors of magnetic storage media. The index may include an interleave index, which may be pre-defined or referenced by a unique index (e.g., 0, 1, . . . 14, 15). In some cases, an indication of the respective index is received, enabling selection of the index for the segments of the codeword to be read. For example, for a given interleaver group of codewords or for a subset of codewords of the group, an index selector of the storage media controller may provide interleave indices for the codewords of the interleaver group to be read back. Alternatively, an index for one codeword may be received, such that method 800 is implemented to read segments of the one codeword from sectors of an interleaver group.

At 804, locations are determined for where the respective partitions having the interleaved codeword segments are within the multiple sectors. The locations may be determined, based on the received index, for the multiple sectors of the codeword. In some cases, a location index for the segments of the codeword is determined based on an interleave index received from the storage media controller.

At 806, a read signal is received that indicates a start of one of the multiple sectors from which one of the interleaved codeword segments is to be read. The read signal may be received from a storage media controller to indicate the start of a sector or a start of each physical sector of a media track. In response to the read signal, the read/write channel may determine, based on the location index, if a codeword segment is to be read from a partition of the sector.

Optionally at 808, the read signal is blocked for other sector partitions of the sector from which the interleaved codeword segment is not to be read. When there is no codeword segment to read, the read/write channel may block the read signal (e.g., read gate) until a next sector partition to prevent reading of an unintended codeword segment. At a next sector partition, the read/write channel may check again to see if there are any codeword segments to read.

Optionally at 810, the interleaved codeword segment is read from the sector partition based on the read signal and locations determined for the codeword segments. When there is a codeword to read to the partition of the sector, the read/write channel may unblock the read signal to read the codeword segment, which may include a pre-amble, synchronization mark, and/or post amble. Optionally, from operation 810, the method 800 may return to operation 806 to read additional codeword segments from sectors of the interleaver group. By so doing, the read/write channel 140 or interleaver 142 may continue processing the codeword segments in similar fashion until the reading of the interleaver group or subset of the interleaver group is complete.

Figure 9:
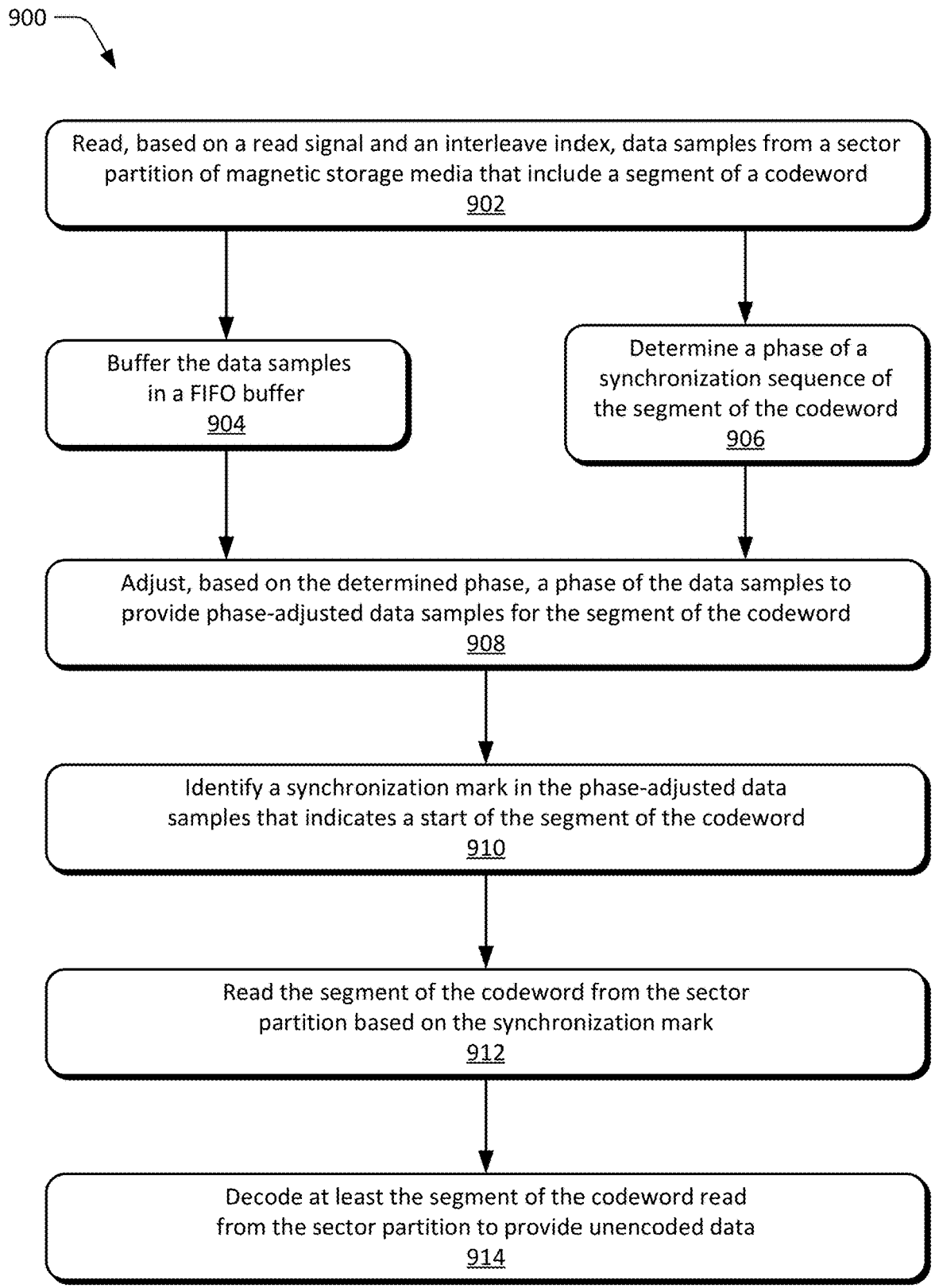
FIG. 9 depicts an example method for reading a segment of a codeword from a sector partition as shown in FIG. 8 with buffered timing recovery.

FIG. 9 depicts an example method 900 for reading a segment of a codeword from a sector partition with buffered timing recovery. The operations of method 900 may be performed by or with the read/write channel 140, interleaver 142, interleave indices 144, and/or buffered timing recovery circuit 146.

At 902, data samples are read from a sector partition of magnetic storage media based on a read signal and an interleave index. The sector partition may store or include a segment of a codeword of encoded data. In some cases, the segment of the codeword was written to the sector partition based on the interleave index, which may enable reading of the segment by using the same interleave index.

At 904, the data samples are buffered in a first-in-first-out (FIFO). The data samples may be buffered in parallel or at least partially during a phase determination or phase computation of a synchronization sequence of the segment of the codeword or sector partition. At 906, a phase of a synchronization sequence of the segment of the codeword is determined. The phase of the synchronization sequence may be determined or computed in parallel or at least partially while the data samples are buffered.

At 908, a phase of the data samples is adjusted to provide phase-adjusted or phase-corrected data samples for the segment of the codeword. This may enable a synchronization mark of the segment to be found without the use of a conventional long synchronization sequence (e.g., such that phase must be calculated before encountering the synchronization mark). At 910, a synchronization mark in the phase-adjusted data samples is identified that indicates a start (or location in the data samples) of the segment of the codeword. For example, a readback circuit of the read/write channel may identify a proper start of a codeword segment within a sector or partition of the sector.

At 912, the segment of the codeword is read from the sector partition based on (or using) the synchronization mark. For example, the codeword may be identified using the synchronization mark and extracted from the data samples read from the sector of the media track. The segments of one or more codewords may be read from respective partitions of consecutive ones of the sectors of the interleaver group. Alternatively, the segments of one or more codewords may be read from respective partitions of non-consecutive ones of the sectors of the interleaver group. At 914, at least the segment of the codeword read from the sector partition is decoded to provide unencoded data (e.g., user data). In some cases, the segment is combined with other segments of the codeword for decoding to provide the data of the codeword.

System-on-Chip

Figure 10:
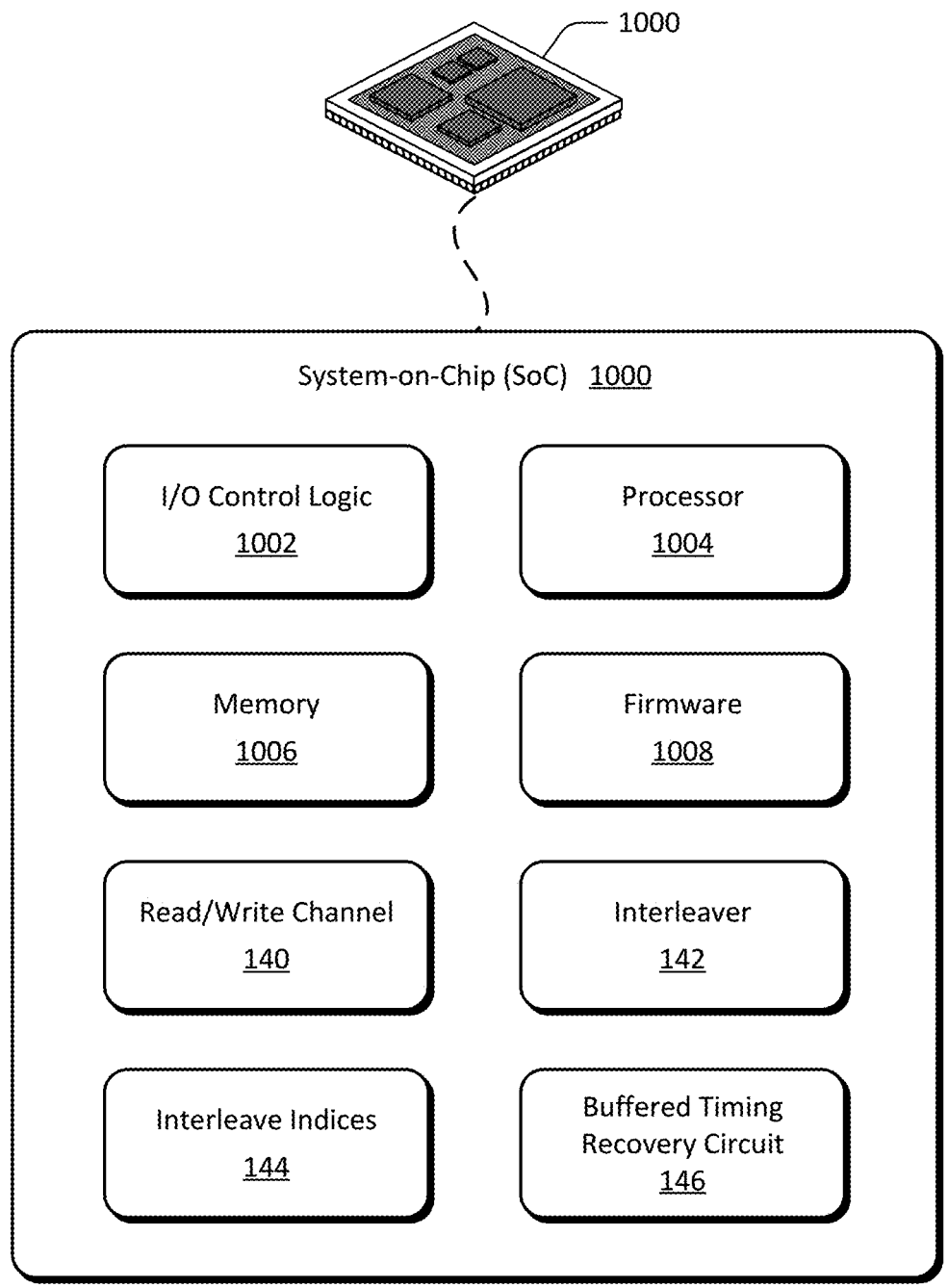
FIG. 10 illustrates an example System-on-Chip (SoC) environment for implementing aspects of codeword interleaving for magnetic storage media.

FIG. 10 illustrates an example System-on-Chip (SoC) 1000 that may implement various aspects of codeword interleaving for magnetic storage media. The SoC 1000 may be implemented in any suitable device, such as a smartphone, netbook, tablet computer, access point, network-attached storage, camera, smart appliance, printer, set-top box, server, solid-state drive (SSD), magnetic tape drive, hard-disk drive (HDD), storage drive array, memory module, storage media controller, storage media interface, head-disk assembly, magnetic media pre-amplifier, automotive computing system, or any other suitable type of device (e.g., others described herein). Although described with reference to a SoC, the entities of FIG. 10 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1000 may be integrated with electronic circuitry, a microprocessor, memory, input-output (I/O) control logic, communication interfaces, firmware, and/or software useful to provide functionalities of a computing device or magnetic storage system, such as any of the devices or components described herein (e.g., hard-disk drive). The SoC 1000 may also include an integrated data bus or interconnect fabric (not shown) that couples the various components of the SoC for data communication or routing between the components. The integrated data bus, interconnect fabric, or other components of the SoC 1000 may be exposed or accessed through an external port, parallel data interface, serial data interface, peripheral component interface, or any other suitable data interface. For example, the components of the SoC 1000 may access or control external storage media or magnetic write circuitry through an external interface or off-chip data interface.

In this example, the SoC 1000 is shown with various components that include input-output (I/O) control logic 1002 and a hardware-based processor 1004 (processor 1004), such as a microprocessor, processor core, application processor, DSP, or the like. The SoC 1000 also includes memory 1006, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1004 and code (e.g., firmware) stored on the memory 1006 are implemented as a storage media controller or as part of a storage media interface to provide various functionalities (e.g., read/write channel functions) associated with codeword interleaving for magnetic storage media. In the context of this disclosure, the memory 1006 stores data, code, instructions, or other information via non-transitory signals, and does not include carrier waves or transitory signals. Alternatively or additionally, SoC 1000 may comprise a data interface (not shown) for accessing additional or expandable off-chip storage media, such as magnetic memory or solid-state memory (e.g., Flash or NAND memory).

The SoC 1000 may also include firmware 1008, applications, programs, software, and/or operating system, which may be embodied as processor-executable instructions maintained on the memory 1006 for execution by the processor 1004 to implement functionalities of the SoC 1000. The SoC 1000 may also include other communication interfaces, such as a transceiver interface for controlling or communicating with components of a local on-chip (not shown) or off-chip communication transceiver. Alternatively or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1000. For example, the SoC 1000 may include a transceiver interface configured to enable storage over a wired or wireless network, such as to provide a network attached storage (NAS) device with codeword interleaving features.

In this example, the SoC 1000 also includes a read/write channel 140, an interleaver 142, interleave indices 144, and a buffered timing recovery circuit 146, which may be implemented separately as shown or combined with a storage component or data interface. Alternatively or additionally, the SoC 1000 may include interfaces to a pre-amplifier, storage media controller, and/or a spindle/motor assembly of a magnetic media disk drive. As described herein, the interleaver 142 may partition sectors, segment codewords, select interleave indices (for write or read operations), interleave codeword segments for writing to storage media, aggregate codeword segments read from storage media, or any combination of the like to implement aspects of codeword interleaving for magnetic storage media. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2, FIG. 3, and/or FIG. 4. The interleaver 142, either in whole or part, may be implemented as digital logic, circuitry, and/or processor-executable instructions maintained by the memory 1006 and executed by the processor 1004 to implement various aspects or features of codeword interleaving for magnetic storage media.

The interleaver 142, may be implemented independently or in combination with any suitable component or circuitry to implement aspects described herein. For example, an interleaver may be implemented as part of a DSP, processor/storage bridge, I/O bridge, graphics processing unit, memory controller, storage controller, arithmetic logic unit (ALU), or the like. The interleaver 142 may also be provided integral with other entities of SoC 1000, such as integrated with the processor 1004, memory 1006, a storage media interface, or firmware 1008 of the SoC 1000. Alternatively or additionally, the interleaver 142, and/or other components of the SoC 1000 may be implemented as hardware, firmware, fixed logic circuitry, or any combination thereof.

Figure 11:
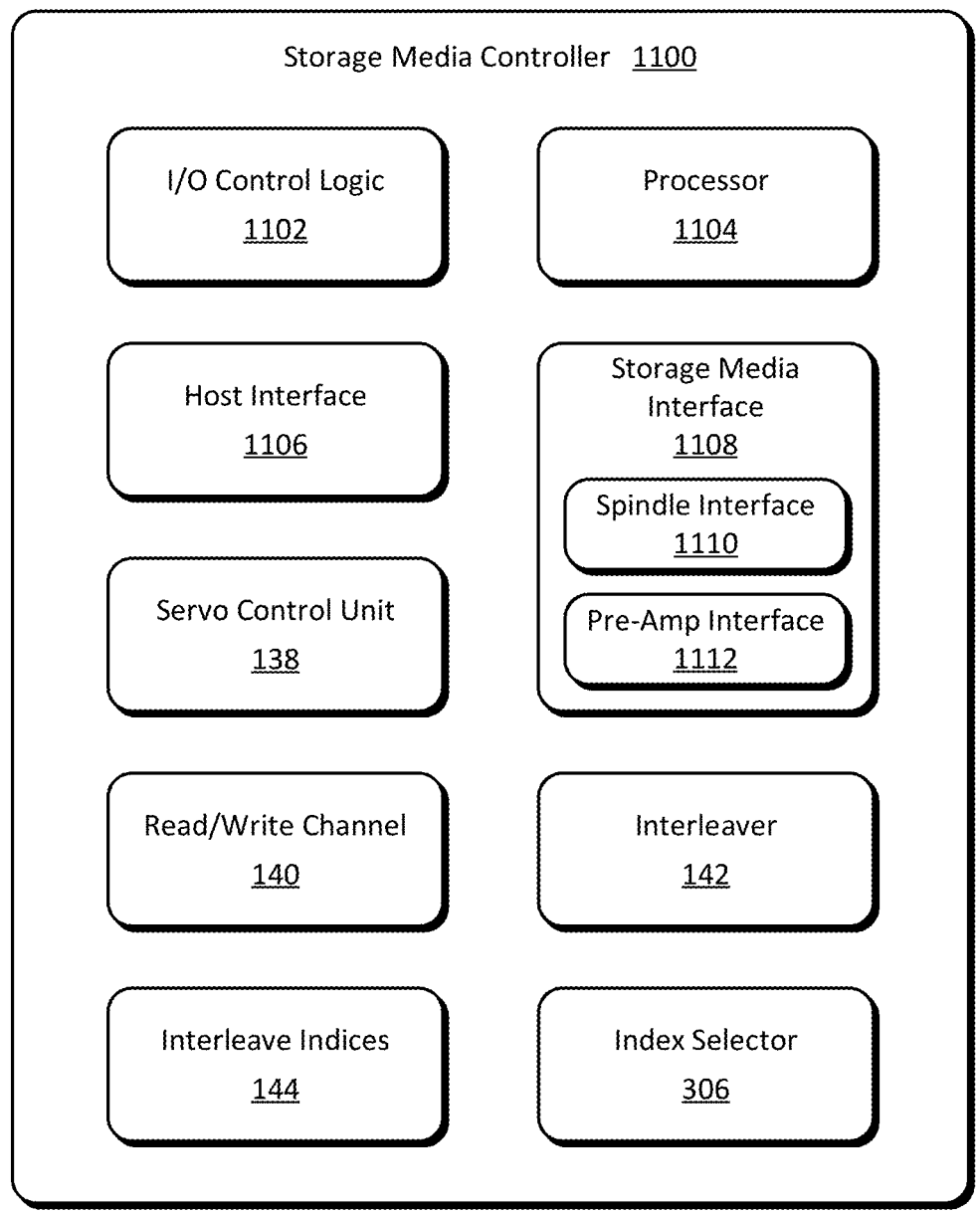
FIG. 11 illustrates an example storage media controller configured to implement aspects of codeword interleaving for magnetic storage media.

As another example, consider FIG. 11 which illustrates an example storage media controller 1100 in accordance with one or more aspects of codeword interleaving for magnetic storage media. Generally, the storage media controller 1100 enables the computing device 102 to access contents of magnetic storage media, such as an operating system, applications, or data for applications or other services. The storage media controller may also write and read data of the computing device 102 to and from the magnetic storage media with which the controller is associated.

In various aspects, the storage media controller 1100 or any combination of components thereof may be implemented as a storage drive controller (e.g., HDD controller or HDD chipset), storage media controller, NAS controller, storage media interface, storage media endpoint, storage media target, or a storage aggregation controller for magnetic storage media, solid-state storage media, or the like (e.g., hybrid SSD/HDD storage systems). In some cases, the storage media controller 1100 is implemented similar to or with components of the SoC 1000 as described with reference to FIG. 10. In other words, an instance of the SoC 1000 may be configured as a storage media controller, such as the storage media controller 1100 to manage magnetic storage media. In this example, the storage media controller 1100 includes input-output (I/O) control logic 1102 and a processor 1104, such as a microprocessor, microcontroller, processor core, application processor, DSP, or the like. The storage media controller also includes a host interface 1106 (e.g., SATA, PCIe, NVMe, or Fabric interface) and a storage media interface 1108 (e.g., magnetic media interface or head-disk assembly (HDA) interface), which enable access to a host system (or fabric) and storage media, respectively. In this example, the storage media interface includes separate instances of a spindle interface 1110 and a pre-amp interface 1112, such as to enable communication with a head-disk assembly of a media drive.

In some aspects, the storage media controller 1100 implements aspects of codeword interleaving for magnetic storage media when managing or enabling access to storage media that is coupled to the storage media interface 1108. The storage media controller 1100 may provide a storage interface for a host system via the host interface 1106, through which storage access commands, such as data to write to the magnetic storage media are received from the host system. As shown in FIG. 11, the storage media controller 1100 may also include a servo control unit 138, read/write channel 140, and an interleaver 142 for implementing aspects of codeword interleaving. In this example, the storage media controller also includes interleave indices 144 and an index selector 304, which may be implemented or accessed by the interleaver 142 as described herein. Although not shown, the read/write channel 140 or the interleaver 142 may also include a buffered timing recovery circuit 146 for reading back segments of codewords from sector partitions. The servo control unit 138 is operably coupled to the spindle interface 1110 and may provide spindle or voice coil control for a magnetic media drive. In some aspects, the processor 1104 and firmware or logic of the storage media controller 1100 are implemented to provide the interleaver 142 and/or various data writing or processing functionalities associated with codeword interleaving for magnetic storage media.

The interleaver 142 of the storage media controller 1100 may be implemented separately as shown or combined with the processor 1104, read/write channel 140, or storage media interface 1108. In accordance with various aspects, the interleaver 142 may partition sectors, segment codewords, interleave codeword segments for writing to storage media, aggregate codeword segments read from storage media, or any combination of the like. Examples of these components and/or entities, or corresponding functionality, are described with reference to the respective components or entities of the environment 100 of FIG. 1 or respective configurations illustrated in FIG. 2, FIG. 3, and/or FIG. 4. The interleaver 142, either in whole or part, may be implemented as processor-executable instructions maintained by memory of the controller and executed by the processor 1104 to implement various aspects and/or features of codeword interleaving for magnetic storage media.

Although the subject matter has been described in language specific to structural features and/or methodological operations, it is to be understood that the subject matter defined in the appended claims is not necessarily limited to the specific examples, features, or operations described herein, including orders in which they are performed.

In the following, various examples are described:

Example 1: A method for improving reliability of data written to magnetic storage media, comprising:

receiving data for one or more codewords to be written to a set of multiple sectors of the magnetic storage media;

selecting, for each of for the one or more codewords, a respective indicator that indicates within which partitions of the multiple sectors the segments of the codeword are to be written;

encoding the data to provide one or more codewords of encoded data;

placing the segments of the one or more codewords into an interleaver based on the respective indicator corresponding to each of the codewords; and writing, from the interleaver, the segments of each of the one or more codewords to the partitions of at least some of the multiple sectors to interleave the respective segments of the codewords across the set of multiple sectors of the magnetic storage media.

Example 2: The method of example 1 or any following example, wherein the respective indicators that correspond to each codeword include pre-defined indices and the method further comprises receiving, from a storage media controller, an indication of which pre-defined index corresponds to at least one of the codewords.

Example 3: The method of any preceding or following example, further comprising determining, for at least one of the codewords, a location index for where the segments of the codeword are to be written to respective partitions of the at least some of the multiple sectors.

Example 4: The method of any preceding or following example, further comprising:

receiving, from a storage media controller, a write signal that indicates a start of one of the multiple sectors;

determining, based on the location index for the at least one codeword, that one of the segments of the codeword is to be written to one of the partitions of the sector; and writing, based on the write signal and the location index, one of the segments of the codeword to the partition of the sector for which the write signal is received.

Example 5: The method of any preceding or following example, further comprising:

receiving, from a storage media controller, a write signal that indicates a start of one of the multiple sectors;

determining, based on the location index for the at least one codeword, that one of the segments of the codeword is not to be written to one of the partitions of the sector; and blocking, based on the location index of the codeword, the write signal to prevent writing of the partition of the sector to which one of the segments of the codeword is not to be written.

Example 6: The method of any preceding or following example, wherein:
the set of multiple sectors of the magnetic storage media include consecutive sectors of the magnetic storage media; and
writing the segments of the one or more codewords to partitions includes writing segments of at least one of the codewords to nonconsecutive sectors of the multiple sectors of the magnetic storage media.

Example 7: The method of any preceding or following example, wherein:
the set of multiple sectors of the magnetic storage media include consecutive sectors of the magnetic storage media; and
writing the segments of the one or more codewords to partitions includes writing segments of at least one of the codewords to consecutive sectors of the multiple sectors of the magnetic storage media.

Example 8: The method of any preceding example, wherein writing the respective segments of the one or more codewords to the partitions of the multiple sectors includes writing segments of at least one of the codewords to each sector of the set of the multiple sectors of the magnetic storage media.

Example 9: An apparatus for improved data storage reliability, comprising:
an interface to receive data from a host;
a disk of magnetic storage media arranged in sectors to store the data;
an interleave buffer configured to buffer segments of codewords for writing to the sectors of the magnetic storage media; and
an interleaver configured to:
receive, from the host device, data that corresponds to one or more codewords to be stored by a set of multiple sectors of the magnetic storage media;
select, for each of the one or more codewords, a respective indicator indicating within which partitions of the multiple sectors that segments of the codeword are to be written;
encode the data for the one or more codewords to provide one or more codewords of encoded data;
place, into the interleave buffer, segments of the one or more codewords based on the respective indicator corresponding to each of the codewords; and
write, from the interleave buffer, the segments of the one or more codewords to the partitions of at least some of the multiple sectors to interleave the respective segments of the codewords across the set of multiple sectors of the magnetic storage media.

Example 10: The apparatus of example 9 or any following example, wherein the interleaver is further configured to determine, for at least one of the codewords, a location index for where the segments of the codeword are to be written to respective ones of the partitions of the multiple sectors.

Example 11: The apparatus of example 10, further comprising:
a storage media controller configured to generate a write signal that indicates a start of one of the multiple sectors, and wherein: the interleaver is further configured to:
determine, based on the location index for the at least one codeword, that one of the segments of the codeword is to be written to one of the partitions of the sector; and
write, based on the write signal and the location index, one of the segments of the at least one codeword to the partition of the sector for which the write signal is received.

Example 12: The apparatus of any preceding or following example, further comprising:
a storage media controller configured to generate a write signal that indicates a start of one of the multiple sectors, and wherein:
the interleaver is further configured to:
determine, based on the location index for the at least one codeword, that one of the segments of the codeword is not to be written to one of the partitions of the sector; and
block, based on the location index, the write signal to prevent writing of the partition of the sector to which one of the segments of the at least one codeword is not to be written.

Example 13: The apparatus of example 11, further comprising a storage media controller configured to:
group the multiple sectors of the magnetic storage media as an interleaved sector group;
provide, to the interleaver, data for a set of codewords that corresponds to the interleaved sector group, the data for the set of codewords including the data for the one or more codewords; and
provide, to the interleaver and for each codeword of the set of codewords, an indication of the respective indicator that corresponds to the codeword to enable the interleaver to select the respective indicator to interleave the segments of the codeword.

Example 14: The apparatus of any preceding or following example, wherein the interleaved sector group includes a number of sectors that is equal to or greater than a number of the one or more codewords with which the interleaved sector group corresponds.

Example 15: The apparatus of any preceding example, wherein:
the segments of the one or more codewords are written to respective partitions of consecutive ones of the multiple sectors; or
the segments of the one or more codewords are written to respective partitions of non-consecutive ones of the multiple sectors.

Example 16: A System-on-Chip (SoC) comprising:
an interface to a storage media controller from which data is received for writing to magnetic storage media;
an interface to a media writer of the magnetic storage media;
an interleave buffer configured to buffer segments of codewords for writing to sectors of the magnetic storage media; and
an interleaver configured to:
receive, from the storage media controller, data that corresponds to one or more codewords to be written to a set of multiple sectors of the magnetic storage media;
receive, from the storage media controller, respective indicators indicating which partitions of the multiple sectors that segments of each of the codewords are to be written;
encode the data for the one or more codewords to provide one or more codewords of encoded data;
place, into the interleave buffer, segments of the one or more codewords based on the respective indicator corresponding to each of the codewords; and
write, from the interleave buffer and with the media writer, the segments of the one or more codewords to the partitions of at least some of the multiple sectors to interleave the respective segments of the codewords across the set of multiple sectors of the magnetic storage media.

Example 17: The SoC of example 16 any following example, wherein the interleaver is further configured to determine, for at least one of the codewords, a location index for where the segments of the codeword are to be written to respective ones of the partitions of the multiple sectors.

Example 18: The SoC of any preceding or following example, wherein the interleaver is further configured to:

receive, from the storage media controller, a write signal that indicates a start of one of the multiple sectors;

determine, based on the location index for the at least one codeword, that one of the segments of the codeword is to be written to one of the partitions of the sector; and write, based on the write signal and the location index, one of the segments of the at least one codeword to the partition of the sector for which the write signal is received.

Example 19: The SoC of any preceding or following example, wherein the interleaver is further configured to:

receive, from the storage media controller, a write signal that indicates a start of one of the multiple sectors;

determine, based on the location index for the at least one codeword, that one of the segments of the codeword is not to be written to one of the partitions of the sector; and block, based on the location index, the write signal to prevent writing of the partition of the sector to which one of the segments of the at least one codeword is not to be written.

Example 20: The SoC of any preceding example, wherein:

the segments of the one or more codewords are written to respective partitions of consecutive ones of the multiple sectors; or the segments of the one or more codewords are written to respective partitions of non-consecutive ones of the multiple sectors.

What is claimed is:

1. A method for improving reliability of data written to magnetic storage media, comprising:
    receiving data for one or more codewords to be written to a set of multiple sectors of the magnetic storage media;
    selecting, for each of for the one or more codewords, a respective indicator that indicates within which partitions of the multiple sectors the segments of the codeword are to be written;
    encoding the data to provide one or more codewords of encoded data;
    placing the segments of the one or more codewords into an interleaver based on the respective indicator corresponding to each of the codewords; and
    writing, from the interleaver, the segments of each of the one or more codewords to the partitions of at least some of the multiple sectors to interleave the respective segments of the codewords across the set of multiple sectors of the magnetic storage media.

2. The method of claim 1, wherein the respective indicators that correspond to each codeword include pre-defined indices and the method further comprises receiving, from a storage media controller, an indication of which pre-defined index corresponds to at least one of the codewords.

3. The method of claim 1, further comprising determining, for at least one of the codewords, a location index for where the segments of the codeword are to be written to respective partitions of the at least some of the multiple sectors.

4. The method of claim 3, further comprising:
    receiving, from a storage media controller, a write signal that indicates a start of one of the multiple sectors;
    determining, based on the location index for the at least one codeword, that one of the segments of the codeword is to be written to one of the partitions of the sector; and
    writing, based on the write signal and the location index, one of the segments of the codeword to the partition of the sector for which the write signal is received.

5. The method of claim 3, further comprising:
    receiving, from a storage media controller, a write signal that indicates a start of one of the multiple sectors;
    determining, based on the location index for the at least one codeword, that one of the segments of the codeword is not to be written to one of the partitions of the sector; and
    blocking, based on the location index of the codeword, the write signal to prevent writing of the partition of the sector to which one of the segments of the codeword is not to be written.

6. The method of claim 1, wherein:
    the set of multiple sectors of the magnetic storage media include consecutive sectors of the magnetic storage media; and
    writing the segments of the one or more codewords to partitions includes writing segments of at least one of the codewords to nonconsecutive sectors of the multiple sectors of the magnetic storage media.

7. The method of claim 1, wherein:
    the set of multiple sectors of the magnetic storage media include consecutive sectors of the magnetic storage media; and
    writing the segments of the one or more codewords to partitions includes writing segments of at least one of the codewords to consecutive sectors of the multiple sectors of the magnetic storage media.

8. The method of claim 1, wherein writing the respective segments of the one or more codewords to the partitions of the multiple sectors includes writing segments of at least one of the codewords to each sector of the set of the multiple sectors of the magnetic storage media.

9. An apparatus for improved data storage reliability, comprising:
    an interface to receive data from a host;
    a disk of magnetic storage media arranged in sectors to store the data;
    an interleave buffer configured to buffer segments of codewords for writing to the sectors of the magnetic storage media; and
    an interleaver configured to:
        receive, from the host device, data that corresponds to one or more codewords to be stored by a set of multiple sectors of the magnetic storage media;
        select, for each of the one or more codewords, a respective indicator indicating within which partitions of the multiple sectors that segments of the codeword are to be written;
        encode the data for the one or more codewords to provide one or more codewords of encoded data;
        place, into the interleave buffer, segments of the one or more codewords based on the respective indicator corresponding to each of the codewords; and
        write, from the interleave buffer, the segments of the one or more codewords to the partitions of at least some of the multiple sectors to interleave the respective segments of the codewords across the set of multiple sectors of the magnetic storage media.

10. The apparatus of claim 9, wherein the interleaver is further configured to determine, for at least one of the codewords, a location index for where the segments of the codeword are to be written to respective ones of the partitions of the multiple sectors.

11. The apparatus of claim 10, further comprising:
a storage media controller configured to generate a write signal that indicates a start of one of the multiple sectors, and wherein:
the interleaver is further configured to:
determine, based on the location index for the at least one codeword, that one of the segments of the codeword is to be written to one of the partitions of the sector; and
write, based on the write signal and the location index, one of the segments of the at least one codeword to the partition of the sector for which the write signal is received.

12. The apparatus of claim 10, further comprising:
a storage media controller configured to generate a write signal that indicates a start of one of the multiple sectors, and wherein:
the interleaver is further configured to:
determine, based on the location index for the at least one codeword, that one of the segments of the codeword is not to be written to one of the partitions of the sector; and
block, based on the location index, the write signal to prevent writing of the partition of the sector to which one of the segments of the at least one codeword is not to be written.

13. The apparatus of claim 11, further comprising a storage media controller configured to:
group the multiple sectors of the magnetic storage media as an interleaved sector group;
provide, to the interleaver, data for a set of codewords that corresponds to the interleaved sector group, the data for the set of codewords including the data for the one or more codewords; and
provide, to the interleaver and for each codeword of the set of codewords, an indication of the respective indicator that corresponds to the codeword to enable the interleaver to select the respective indicator to interleave the segments of the codeword.

14. The apparatus of claim 13, wherein the interleaved sector group includes a number of sectors that is equal to or greater than a number of the one or more codewords with which the interleaved sector group corresponds.

15. The apparatus of claim 9, wherein:
the segments of the one or more codewords are written to respective partitions of consecutive ones of the multiple sectors; or
the segments of the one or more codewords are written to respective partitions of non-consecutive ones of the multiple sectors.

16. A System-on-Chip (SoC) comprising:
an interface to a storage media controller from which data is received for writing to magnetic storage media;
an interface to a media writer of the magnetic storage media;
an interleave buffer configured to buffer segments of codewords for writing to sectors of the magnetic storage media; and
an interleaver configured to:
receive, from the storage media controller, data that corresponds to one or more codewords to be written to a set of multiple sectors of the magnetic storage media;
receive, from the storage media controller, respective indicators indicating which partitions of the multiple sectors that segments of each of the codewords are to be written;
encode the data for the one or more codewords to provide one or more codewords of encoded data;
place, into the interleave buffer, segments of the one or more codewords based on the respective indicator corresponding to each of the codewords; and
write, from the interleave buffer and with the media writer, the segments of the one or more codewords to the partitions of at least some of the multiple sectors to interleave the respective segments of the codewords across the set of multiple sectors of the magnetic storage media.

17. The SoC of claim 16, wherein the interleaver is further configured to determine, for at least one of the codewords, a location index for where the segments of the codeword are to be written to respective ones of the partitions of the multiple sectors.

18. The SoC of claim 17, wherein the interleaver is further configured to:
receive, from the storage media controller, a write signal that indicates a start of one of the multiple sectors;
determine, based on the location index for the at least one codeword, that one of the segments of the codeword is to be written to one of the partitions of the sector; and
write, based on the write signal and the location index, one of the segments of the at least one codeword to the partition of the sector for which the write signal is received.

19. The SoC of claim 17, wherein the interleaver is further configured to:
receive, from the storage media controller, a write signal that indicates a start of one of the multiple sectors;
determine, based on the location index for the at least one codeword, that one of the segments of the codeword is not to be written to one of the partitions of the sector; and
block, based on the location index, the write signal to prevent writing of the partition of the sector to which one of the segments of the at least one codeword is not to be written.

20. The SoC of claim 16, wherein:
the segments of the one or more codewords are written to respective partitions of consecutive ones of the multiple sectors; or
the segments of the one or more codewords are written to respective partitions of non-consecutive ones of the multiple sectors.

* * * * *